United States Patent
McGovern et al.

(10) Patent No.: US 10,561,987 B2
(45) Date of Patent: *Feb. 18, 2020

(54) CONCENTRATION CONTROL IN FILTRATION SYSTEMS, AND ASSOCIATED METHODS

(71) Applicant: Massachusetts Institute of Technology, Cambridge, MA (US)

(72) Inventors: Ronan K. McGovern, Cambridge, MA (US); John H. Lienhard, V, Lexington, MA (US)

(73) Assignee: Massachusetts Institute of Technology, Cambridge, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/892,012

(22) Filed: Feb. 8, 2018

(65) Prior Publication Data
US 2018/0161727 A1   Jun. 14, 2018

Related U.S. Application Data

(63) Continuation of application No. 14/943,905, filed on Nov. 17, 2015, now Pat. No. 9,925,494.
(Continued)

(51) Int. Cl.
*B01D 61/02* (2006.01)
*C12H 3/04* (2019.01)
(Continued)

(52) U.S. Cl.
CPC .......... *B01D 61/022* (2013.01); *B01D 61/12* (2013.01); *B01D 61/142* (2013.01); *B01D 61/22* (2013.01);
(Continued)

(58) Field of Classification Search
None
See application file for complete search history.

(56) References Cited

U.S. PATENT DOCUMENTS

| 4,265,920 A | 5/1981 | Thijssen |
| 4,322,448 A | 3/1982 | Matsuura et al. |

(Continued)

FOREIGN PATENT DOCUMENTS

| CA | 2572410 | 1/2013 |
| EP | 2008702 | 12/2008 |

(Continued)

OTHER PUBLICATIONS

GE Osmonics SWRO-200C System Operation & Maintenance Manual. GE Infrastructure Water & Process Technologies. Lenntech. 38 pages, Oct. 10, 2008.

(Continued)

*Primary Examiner* — Bradley R Spies
(74) *Attorney, Agent, or Firm* — Sunstein Kann Murphy & Timbers LLP

(57) ABSTRACT

Concentration control in filtration systems and associated methods are generally described. Streams originating from upstream filters and having similar concentrations of a target minor component and/or similar osmotic pressures can be mixed and subsequently filtered within additional filters. Certain embodiments comprise recycling an output stream produced by a filter to a filter feed stream, wherein the output stream and the filter feed stream have similar concentrations of a target minor component and/or similar osmotic pressures. Such strategic mixing and/or recycling can reduce the amount of energy and/or the amount of filtration medium surface area required to achieve a desired concentration of the target minor component in a final product stream.

22 Claims, 7 Drawing Sheets

Related U.S. Application Data

(60) Provisional application No. 62/080,675, filed on Nov. 17, 2014.

(51) Int. Cl.
| | | |
|---|---|---|
| *B01D 61/12* | (2006.01) | |
| *B01D 61/22* | (2006.01) | |
| *C12C 11/11* | (2019.01) | |
| *B01D 61/18* | (2006.01) | |
| *B01D 61/08* | (2006.01) | |
| *B01D 61/14* | (2006.01) | |

(52) U.S. Cl.
CPC ............... *C12C 11/11* (2013.01); *C12H 3/04* (2019.02); *B01D 61/08* (2013.01); *B01D 61/18* (2013.01); *B01D 2311/08* (2013.01); *B01D 2311/25* (2013.01); *B01D 2317/022* (2013.01); *B01D 2317/025* (2013.01); *B01D 2317/027* (2013.01)

(56) References Cited

U.S. PATENT DOCUMENTS

| | | | |
|---|---|---|---|
| 4,499,117 | A | 2/1985 | Bonneau |
| 4,532,140 | A | 7/1985 | Bonnome |
| 4,610,887 | A | 9/1986 | Galzy et al. |
| 4,617,127 | A | 10/1986 | Light |
| 4,724,080 | A | 2/1988 | Dau et al. |
| 4,792,402 | A | 12/1988 | Fricker |
| 4,888,189 | A | 12/1989 | Gnekow |
| 4,933,197 | A | 6/1990 | Walker et al. |
| 4,990,350 | A | 2/1991 | Rohmann |
| 4,999,209 | A | 3/1991 | Gnekow |
| 5,403,604 | A | 4/1995 | Black, Jr. et al. |
| 6,977,092 | B2 | 12/2005 | Mantius et al. |
| 7,455,777 | B2 | 11/2008 | Allan |
| 9,925,494 | B2 | 3/2018 | McGovern et al. |
| 2006/0124547 | A1 | 6/2006 | Allan |
| 2006/0254981 | A1 | 11/2006 | Efraty |
| 2008/0081096 | A1 | 4/2008 | Subramaniam et al. |
| 2010/0047386 | A1 | 2/2010 | Tatera |
| 2011/0147309 | A1 | 6/2011 | Palacios Doñaque et al. |

FOREIGN PATENT DOCUMENTS

| | | |
|---|---|---|
| EP | 3026104 | 6/2016 |
| GB | 1177126 | 1/1970 |
| GB | 2133418 | 7/1984 |
| WO | WO 92/08783 | 5/1992 |
| WO | WO 03/013704 | 2/2003 |
| WO | WO 2012/033257 | 3/2012 |
| WO | WO 2016/083482 | 6/2016 |
| WO | WO2016/207079 | 12/2016 |
| WO | WO2018/100042 | 6/2018 |
| WO | WO2018/100044 | 6/2018 |
| WO | WO2018/100046 | 6/2018 |
| WO | WO2018/100049 | 6/2018 |
| WO | WO2018/100052 | 6/2018 |
| WO | WO2018/134285 | 7/2018 |

OTHER PUBLICATIONS

[No Author Listed] Flow Configuration. Hydranautics: High Performance Membrane Products. A Nittoo Denko Corporation, 8 pages, Jan. 23, 2001 http://www.membranes.com/docs/trc/flowcon.pdf.

Branyik et al., "A Review of Methods of Low Alcohol and Alcohol-Free Beer Production," *J. Food Engin.*, vol. 108, No. 4, pp. 493-506, Feb. 2012.

Bui et al., "A Reverse Osmosis of the Production of Low Ethanol Content Wine," *Am. J. Enol. Vitic.*, vol. 37, No. 4, pp. 297-300, Jan. 1986.

International Searching Authority, International Search Report—International Application No. PCT/US2015/060972, dated Mar. 17, 2016 together with the Written Opinion of the International Searching Authority, 9 pages.

CONCENTRATION CONTROL IN FILTRATION SYSTEMS, AND ASSOCIATED METHODS

RELATED APPLICATIONS

This application is a continuation of U.S. patent application Ser. No. 14/943,905, filed Nov. 17, 2015, entitled "Concentration Control in Filtration Systems, and Associated Methods," which claims priority under 35 U.S.C. § 119(e) to U.S. Provisional Patent Application Ser. No. 62/080,675, filed Nov. 17, 2014, entitled "Concentration Control in Filtration Systems, and Associated Methods," the contents of each of which are incorporated by reference herein in their entirety for all purposes.

TECHNICAL FIELD

Concentration control in filtration systems and associated methods are generally described.

BACKGROUND

Separation of components within an initial mixture is a common task performed in a number of industries. Filtration is one method that can be used to perform such separations. Filtration systems have been employed in which an inlet stream containing a mixture of two or more components is transported over a filtration medium to produce a first stream transported through the filter (generally referred to as a permeate stream, which is enriched in the component that is more readily transported through the filtration medium) and a second stream that is not transported through the filter (generally referred to as a retentate stream, which is enriched in the component that is less readily transported through the filtration medium).

It can be challenging, in some instances, to achieve effective separation of components within an initial mixture using filtration systems. For example, one challenge faced in the beer industry is effectively using filtration-based systems to concentrate beer, as ethanol is generally less effectively filtered from water than dissolved salts. In addition, current commercial processes for concentrating such mixtures are generally inefficient from both an energy and capital cost standpoint.

Improved systems and methods for performing filtration are therefore desirable.

SUMMARY

Concentration control in filtration systems and associated methods are generally described. Certain embodiments comprise mixing streams with similar concentrations of a target minor component and/or similar osmotic pressures before filtration of the mixture. Some embodiments comprise recycling an output stream produced by a filter to a filter feed stream, wherein the output stream and the filter feed stream have similar concentrations of a target minor component and/or similar osmotic pressures. The subject matter of the present invention involves, in some cases, interrelated products, alternative solutions to a particular problem, and/or a plurality of different uses of one or more systems and/or articles.

According to certain embodiments, a method of concentrating a minor component of a liquid feed is provided. The method comprises, according to certain embodiments, establishing a hydraulic pressure differential across a filtration medium within a first filter receiving a liquid feed comprising a major component and the minor component to produce a first permeate enriched in the major component relative to the liquid feed and a first retentate enriched in the minor component relative to the liquid feed; establishing a hydraulic pressure differential across a filtration medium within a second filter receiving at least a portion of the first permeate to produce a second permeate enriched in the major component relative to the first permeate and a second retentate enriched in the minor component relative to the first permeate; establishing a hydraulic pressure differential across a filtration medium within a third filter receiving at least a portion of the second retentate to produce a third permeate enriched in the major component relative to the second retentate and a third retentate enriched in the minor component relative to the second retentate; and recycling at least a portion of the third retentate to the retentate side of the first filter and mixing the portion of the third retentate with at least a portion of the liquid feed. In some such embodiments, the minor component is present within the third retentate at a weight percentage, and the minor component is present within the liquid feed at a weight percentage, and the lower of the weight percentage of the minor component in the third retentate and the weight percentage of the minor component in the liquid feed is at least about 0.5 times the higher of the weight percentage of the minor component in the third retentate and the weight percentage of the minor component in the liquid feed.

In some embodiments, the method comprises establishing a hydraulic pressure differential across a filtration medium within a first filter receiving a liquid feed comprising a major component and the minor component to produce a first permeate enriched in the major component relative to the liquid feed and a first retentate enriched in the minor component relative to the liquid feed; establishing a hydraulic pressure differential across a filtration medium within a second filter receiving at least a portion of the first permeate to produce a second permeate enriched in the major component relative to the first permeate and a second retentate enriched in the minor component relative to the first permeate; establishing a hydraulic pressure differential across a filtration medium within a third filter receiving at least a portion of the second retentate to produce a third permeate enriched in the major component relative to the second retentate and a third retentate enriched in the minor component relative to the second retentate; and recycling at least a portion of the third retentate to the retentate side of the first filter and mixing the portion of the third retentate with at least a portion of the liquid feed. In some such embodiments, the lower of the osmotic pressure of the third retentate and the osmotic pressure of the liquid feed is at least about 0.5 times the higher of the osmotic pressure of the third retentate and the osmotic pressure of the liquid feed.

The method comprises, according to certain embodiments, establishing a hydraulic pressure differential across a filtration medium within a first filter receiving a liquid feed comprising a major component and the minor component to produce a first permeate enriched in the major component relative to the liquid feed and a first retentate enriched in the minor component relative to the liquid feed; establishing a hydraulic pressure differential across a filtration medium within a second filter receiving at least a portion of the first permeate to produce a second permeate enriched in the major component relative to the first permeate and a second retentate enriched in the minor component relative to the first permeate; establishing a hydraulic pressure differential across a filtration medium within a third filter receiving at least a portion of the first retentate to produce a third permeate enriched in the major component relative to the first retentate and a third retentate enriched in the minor component relative to the first retentate; and mixing at least a portion of the second retentate with at least a portion of the third permeate. In some such embodiments, the minor component is present within the second retentate at a weight percentage, and the minor component is present within the third permeate at a weight percentage, and the lower of the weight percentage of the minor component in the second retentate and the weight percentage of the minor component in the third permeate is at least about 0.5 times the higher of the weight percentage of the minor component in the second retentate and the weight percentage of the minor component in the third permeate.

The method comprises, according to some embodiments, establishing a hydraulic pressure differential across a filtration medium within a first filter receiving a liquid feed comprising a major component and the minor component to produce a first permeate enriched in the major component relative to the liquid feed and a first retentate enriched in the minor component relative to the liquid feed; establishing a hydraulic pressure differential across a filtration medium within a second filter receiving at least a portion of the first permeate to produce a second permeate enriched in the major component relative to the first permeate and a second retentate enriched in the minor component relative to the first permeate; establishing a hydraulic pressure differential across a filtration medium within a third filter receiving at least a portion of the first retentate to produce a third permeate enriched in the major component relative to the first retentate and a third retentate enriched in the minor component relative to the first retentate; and mixing at least a portion of the second retentate with at least a portion of the third permeate. In some such embodiments, the lower of the osmotic pressure of the second retentate and the osmotic pressure of the third permeate is at least about 0.5 times the higher of the osmotic pressure of the second retentate and the osmotic pressure of the third permeate.

Certain embodiments are related to filtration systems. In some embodiments, the filtration system comprises a first filter comprising a first filtration medium defining a permeate side and a retentate side of the first filter, the retentate side of the first filter fluidically connected to a feed stream; a second filter comprising a second filtration medium defining a permeate side and a retentate side of the second filter, the retentate side of the second filter fluidically connected to the permeate side of the first filter; a third filter comprising a third filtration medium defining a permeate side and a retentate side of the third filter, the retentate side of the third filter fluidically connected to the retentate side of the second filter; and a fluidic connection between the retentate side of the third filter and the retentate side of the first filter.

The filtration system comprises, in some embodiments, a first filter comprising a first filtration medium defining a permeate side and a retentate side of the first filter, the retentate side of the first filter fluidically connected to a feed stream; a second filter comprising a second filtration medium defining a permeate side and a retentate side of the second filter, the retentate side of the second filter fluidically connected to the permeate side of the first filter; a third filter comprising a third filtration medium defining a permeate side and a retentate side of the third filter, the retentate side of the third filter fluidically connected to the retentate side of the first filter; and a fluidic connection between the retentate side of the second filter and the permeate side of the third filter.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1:
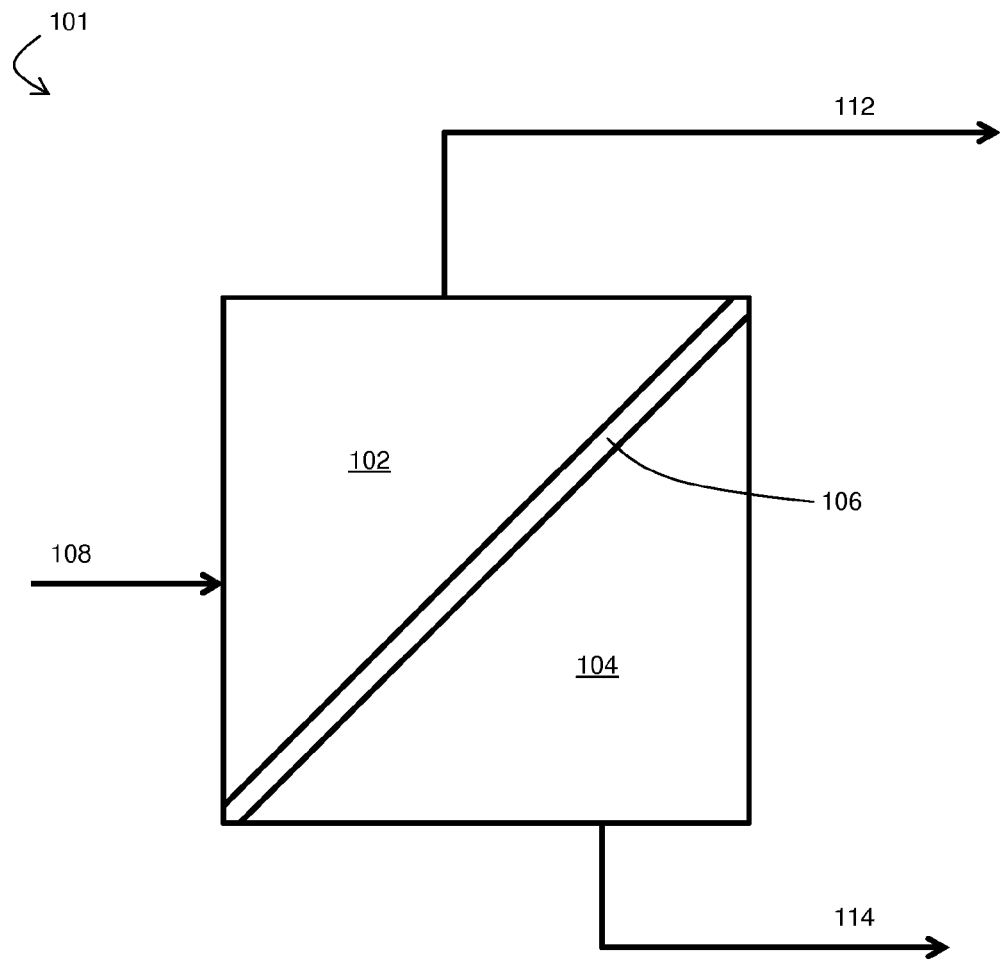
FIG. 1 is an exemplary schematic illustration of a filter, which may be used in association with certain embodiments described herein.

Concentration control in filtration systems and associated methods are generally described. In certain embodiments, streams originating from upstream filters and having similar concentrations of a target minor component and/or similar osmotic pressures can be mixed and subsequently filtered within additional filters. Certain embodiments comprise recycling an output stream produced by a filter to a filter feed stream, wherein the output stream and the filter feed stream have similar concentrations of a target minor component and/or similar osmotic pressures. Such strategic mixing and/or recycling can reduce the amount of energy and/or the amount of filtration medium surface area required to achieve a desired concentration of the target minor component in a final product stream.

Certain of the embodiments described herein can be used in filtration systems and/or methods in which the filtration medium is permeable to multiple components in the inlet mixture. As one non-limiting example, reverse osmosis membranes are typically at least partially permeable to ethanol, in addition to water. Accordingly, in some such cases, when mixtures comprising water and ethanol are processed using reverse osmosis systems, both ethanol and water are transported through the reverse osmosis membrane, leading to incomplete separation of the ethanol from the permeate water. This behavior is in contrast to the behavior typically observed in reverse osmosis systems in which dissolved salts are separated from solvents (e.g., water), in which substantially complete separation between permeate water and dissolved salt is often achieved. Incomplete filtration of ethanol from water can lead to challenges in producing concentrates of ethanol-containing mixtures (e.g., beer, wine, liquor, and the like). Certain, although not necessarily all, of the embodiments described herein can be advantageously employed in certain such systems to reduce the amount of energy and/or the amount of filtration medium surface area that is needed to perform a desired concentration process, as described in more detail below.

Certain embodiments involve using filters to concentrate a minor component of a liquid feed comprising the minor component and a major component. The term "major component" is generally used herein to describe the most abundant component—by weight percentage (wt %)—of a mixture within a liquid feed. "Minor components" are all components of the mixture that are not the major component.

In some embodiments, there is a single minor component in the mixture of the liquid feed. For example, in a mixture that is 60 wt % water and 40 wt % ethanol, water would be the major component and ethanol would be the (single) minor component.

In other embodiments, multiple minor components may be present in the mixture of the liquid feed. For example, in a mixture that is 45 wt % water, 30 wt % ethanol, and 25 wt % methanol, water would be the major component, and ethanol and methanol would both be minor components.

According to certain embodiments, the liquid feed can contain a "target minor component." Generally, the target minor component corresponds to the minor component within the liquid feed that the filtration system is configured to concentrate. In liquid feeds containing only a major component and a minor component, the target minor component is—by default—the single minor component. In cases where the feed stream comprises multiple minor components, any of the minor components can be the target minor component. In certain embodiments, the target minor component corresponds to the second most abundant component in the liquid feed, by weight percentage (which corresponds to the most abundant of the minor components in the liquid feed, by weight percentage). For example, in some embodiments, the liquid feed comprises water as the major component, ethanol as the most abundant minor component, and an additional minor component that is less abundant than ethanol, and the target minor component is ethanol.

As described in more detail below, a variety of suitable filters can be used in association with the systems and methods described herein. FIG. 1 is a cross-sectional schematic illustration of an exemplary filter 101, which can be used in association with certain of the embodiments described herein. Filter 101 comprises filtration medium 106. The filtration medium can define a permeate side and a retentate side of the filter. For example, in FIG. 1, filtration medium 106 separates filter 101 into retentate side 102 (to which the incoming liquid feed is transported) and permeate side 104. The filtration medium can allow at least one component (e.g., the major component) of an incoming liquid feed (which can contain a mixture of a major component and at least one minor component) to pass through the filtration medium to a larger extent that at least one other component (e.g., a minor component, such as the target minor component) of the incoming liquid mixture.

During operation, a hydraulic pressure differential can be established across the filtration medium within the filter. The hydraulic pressure differential can be established across the filtration medium such that the gauge pressure on the retentate side of the filter ($P_R$) exceeds the gauge pressure on the permeate side of the filter ($P_P$). In some cases, a hydraulic pressure differential can be established across the filtration medium by applying a positive pressure to the retentate side of the filter. For example, referring to FIG. 1, a hydraulic pressure differential can be established across filtration medium 106 by applying a positive pressure to retentate side 102 of filter 101. The positive pressure can be applied, for example, using a pump, a pressurized gas stream, or any other suitable pressurization device. In some cases, a hydraulic pressure differential can be established across the filtration medium by applying a negative pressure to the permeate side of the filter. Referring to FIG. 1, for example, a hydraulic pressure differential can be established across filtration medium 106 by applying a negative pressure to permeate side 104 of filter 101. The negative pressure can be applied, for example, by drawing a vacuum on the permeate side of the filter. In some cases, the applied hydraulic pressure differential within the filter can vary spatially. In some such embodiments, the applied hydraulic pressure differential within the filter is uniform within 5 bar.

Establishing the hydraulic pressure differential across the filtration medium can produce a first permeate enriched in the major component relative to the liquid feed and a first retentate enriched in a minor component (e.g., the target minor component) relative to the liquid feed. For example, in FIG. 1, a liquid feed containing a major component and a minor component (e.g., the target minor component) can be transported to filter 101 via liquid feed 108. In certain embodiments, a hydraulic pressure differential is established across filtration medium 106 such that the hydraulic pressure decreases from retentate side 102 of filter 101 to permeate side 104 of filter 101. The established hydraulic pressure differential across the filtration medium ($\Delta P_E$) can be expressed as:

$$\Delta P_E = P_R - P_P$$

where $P_R$ is the gauge pressure on the retentate side of the filter and $P_P$ is the gauge pressure on the permeate side of the filter. Generally, the liquid mixtures in the filter will each have an osmotic pressure associated with them. For example, the liquid on the retentate side of the filter will generally have an osmotic pressure $\Pi_R$, and the liquid of the permeate side of the filter will generally have an osmotic pressure $\Pi_P$. Accordingly, the osmotic pressure differential across the filtration medium ($\Delta \Pi$) can be expressed as:

$$\Delta \Pi = \Pi_R - \Pi_P$$

In certain embodiments, when the established hydraulic pressure differential across the filtration medium exceeds the osmotic pressure differential across the filtration medium, one or more components of the liquid feed is transported across the filtration medium. Such behavior is known to those familiar with the phenomenon of reverse osmosis.

In practice, the filtration methods, according to certain embodiments, can proceed by supplying a liquid mixture that is relatively dilute in the target minor component to retentate side 102 of filter 101. Retentate side 102 of filter 101 can have a gauge pressure ($P_R$) sufficiently in excess of the gauge pressure ($P_P$) on permeate side 104 of filter 101 to force at least a portion of the major component through filtration medium 106 while retaining a sufficient amount of the target minor component on retentate side 102 such that the concentration of the target minor component on retentate side 102 of filter 101 increases above the concentration of the target minor component within liquid feed 108. In FIG. 1, for example, establishing the hydraulic pressure differential across filtration medium 106 can produce first permeate 114 enriched in the major component relative to liquid feed 108 and first retentate 112 enriched in a minor component (e.g., the target minor component) relative to liquid feed 108. The filtration process can be continued until a desired concentration of the target minor component is achieved.

In many traditional pressure-based filtration systems (such as reverse osmosis systems), the transport of minor components through the filtration medium is limited such that a high degree of separation is achieved between the major component and the minor component(s) of the liquid mixture fed to the filter. Such systems are said to achieve high rejection levels of the minor component(s). The rejection level of a particular filtration medium with respect to a particular minor component can be expressed as a percentage (also referred to herein as a "rejection percentage," described in more detail below).

While the filtration media of many salt-based filtration systems are capable of achieving high rejection percentages during operation, filtration media of filtration systems used to concentrate other types of minor components frequently cannot achieve such high rejection percentages. For example, when non-charged, low molecular weight compounds such as ethanol are used as minor components, rejection percentages can be quite low. Thus, relatively large amounts of such minor components can be transported— along with the major component—through the filtration medium during operation. This leads to relatively poor separations and can make it difficult to achieve high concentrations of the minor component in the retentate stream without producing substantial amounts of wasted minor component in the permeate stream.

One way to recover minor components) that have been transferred through the filtration medium is to subject the permeate stream to further filtration to produce additional retentate and permeate streams. However, such strategies often require a large number of filters, and are therefore complicated and expensive to implement.

Certain embodiments of the present invention are related to the recognition that systems including multiple filters can be configured and/or operated in a manner such that, where streams are mixed, the osmotic pressures of the mixed streams are similar. By ensuring that mixed streams have similar osmotic pressures, one can reduce the overall amount of energy needed to achieve a desired concentration level, as unnecessary dilutions of concentrated streams can be avoided. Unexpectedly, such strategies can also reduce the number of steps of filtration required to achieve a final target permeate concentration.

Figure 2:
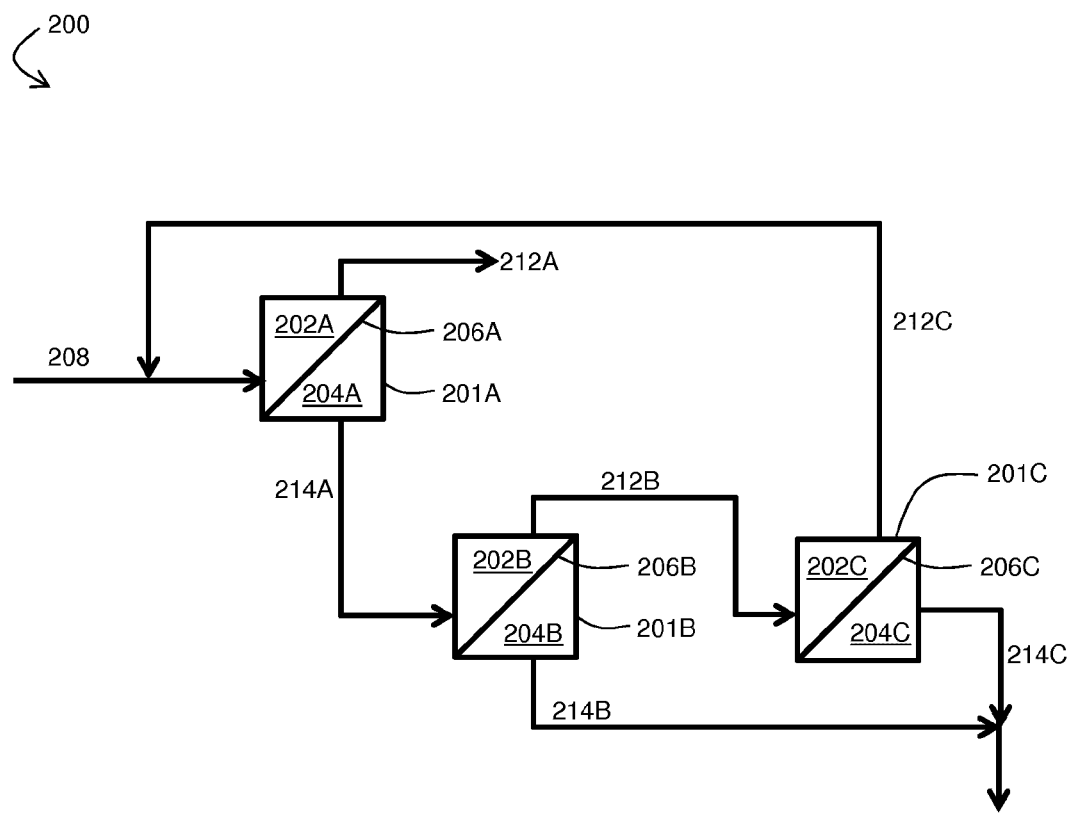
FIG. 2 is, according to certain embodiments, a schematic illustration of a filtration system incorporating a recycle stream.

One way in which such strategic concentration control can be employed is by recycling streams downstream of an upstream filter back to the feed of the upstream filter. In some embodiments, the filtration system comprises a first filter comprising a first filtration medium defining a permeate side and a retentate side of the first filter. In some embodiments, the retentate side of the first filter can be fluidically connected to a feed stream. The feed stream can contain, for example, a liquid mixture comprising a major component and at least one minor component (one of which may be the target minor component). FIG. 2 is a schematic illustration of one such exemplary filtration system 200. In the exemplary embodiment of FIG. 2, first filter 201A can comprise first filtration medium 206A which can define permeate side 204A and retentate side 202A of first filter 201A. In the exemplary embodiment of FIG. 2, retentate side 202A of first filter 201A is fluidically connected to feed stream 208. Feed stream 208 can contain a liquid mixture including a major component and one or more minor components (one of which may be a target minor component).

According to certain embodiments, the filtration system comprises a second filter comprising a second filtration medium defining a permeate side and a retentate side of the second filter. In some embodiments, the retentate side of the second filter is fluidically connected to the permeate side of the first filter. For example, in the exemplary embodiment of FIG. 2, filtration system 200 comprises second filter 201B comprising second filtration medium 206B defining permeate side 204B and retentate side 202B of filter 201B. In FIG. 2, retentate side 202B of second filter 201B is fluidically connected to permeate side 204A of first filter 201A via stream 214A.

In some embodiments, the filtration system comprises a third filter comprising a third filtration medium defining a permeate side and a retentate side of the third filter. In some embodiments, the retentate side of the third filter is fluidically connected to the retentate side of the second filter. For example, in the exemplary embodiment of FIG. 2, filtration system 200 comprises third filter 201C comprising third filtration medium 206C defining permeate side 204C and retentate side 202C of filter 201C. In FIG. 2, retentate side 202C of third filter 2010 is fluidically connected to retentate side 202B of second filter 201B via stream 212B.

In some embodiments, the filtration system comprises a fluidic connection between the retentate side of the third filter and the retentate side of the first filter. Such connection can be made, for example, by connecting a recycle stream to the retentate side of the third filter and the retentate side of the first filter. For example, in the non-limiting embodiment of FIG. 2, filtration system 200 comprises stream 212C, which fluidically connects retentate side 202C of third filter 201C to retentate side 202A of first filter 201A. While the exemplary embodiment of FIG. 2 shows stream 212C being merged with liquid feed 208 prior to being transported to retentate side 202A of filter 201A, in other embodiments, stream 212C and 208 can be transported separately (e.g., via separate inlets) to retentate side 202A of filter 201A.

Fluidic connections between filters can be made using any suitable connector (e.g., piping, tubing, hoses, and the like). In certain embodiments, fluidic connections between filters can be made using enclosed conduit capable of withstanding hydraulic pressures applied to the fluids within the conduits without substantially leaking.

While direct fluidic connections are illustrated in the exemplary embodiment of FIG. 2, it should be understood that indirect fluidic connections are also possible. Accordingly, in some embodiments, the permeate side of the first filter and the retentate side of the second filter can be directly fluidically connected, for example, such that no filters are fluidically connected between the permeate side of the first filter and the retentate side of the second filter. In other embodiments, the first and second filters can be indirectly fluidically connected, for example, such that one or more intermediate filters is fluidically connected between the permeate side of the first filter and the retentate side of the second filter. In some embodiments, the retentate side of the second filter and the retentate side of the third filter can be directly fluidically connected, for example, such that no filters are fluidically connected between the retentate side of the second filter and the retentate side of the third filter. In other embodiments, the second and third filters can be indirectly fluidically connected, for example, such that one or more intermediate filters is fluidically connected between the retentate side of the second filter and the retentate side of the third filter.

In some embodiments, where single filters are described herein, the single filter can be replaced with multiple filters fluidically connected in parallel. For example, referring to FIG. 2, filter 201A (and/or filter 201B and/or filter 201C) may, according to certain embodiments, be replaced with multiple filters fluidically connected in parallel. Similarly, in FIG. 3 and/or FIG. 4, filter 301A (and/or filter 301B filter 301C, and/or filter 301D) may, according to certain embodiments, be replaced with multiple filters fluidically connected in parallel.

Exemplary filtration systems employing strategic recycling can be operated as follows. Some embodiments comprise establishing a hydraulic pressure differential across a filtration medium within a first filter receiving a liquid feed comprising a major component and a minor component (e.g., the target minor component) to produce a first permeate enriched in the major component relative to the liquid feed and a first retentate enriched in the minor component relative to the liquid feed. For example, referring to the exemplary embodiment of FIG. 2, liquid feed stream 208 can be transported to first filter 201A. A hydraulic pressure differential can be applied across filtration medium 206A of a first filter 201A. Establishing the hydraulic pressure differential across filtration medium 206A can result in at least a portion of the major component being transported across filtration medium 206A. Accordingly, in some such embodiments, establishing a hydraulic pressure differential across filtration medium 206A can produce permeate 214A which is enriched in the major component relative to liquid feed 208. In addition, establishing a hydraulic pressure differential across filtration medium 206A can produce retentate 212A which is enriched in a minor component (e.g., the target minor component) relative to liquid feed 208.

Certain embodiments comprise establishing a hydraulic pressure differential across a filtration medium within a second filter receiving at least a portion (e.g., at least about 10 wt %, at least about 25 wt %, at least about 50 wt %, at least about 75 wt %, at least about 90 wt %, at least about 95 wt %, at least about 99 wt %, or all) of the first permeate to produce a second permeate enriched in the major component relative to the first permeate and a second retentate enriched in a minor component (e.g., the target minor component) relative to the first permeate. For example, in the exemplary embodiment of FIG. 2, at least a portion (or, in some embodiments, all) of permeate 214A from first filter 201A can be transported to retentate side 202B of second filter 201B. A hydraulic pressure differential can be established across filtration medium 206B of second filter 201B. Establishing the hydraulic pressure differential across filtration medium 206B can result in at least a portion of the major component being transported across filtration medium 206B. Accordingly, in some such embodiments, establishing a hydraulic pressure differential across filtration medium 206B can produce second permeate 214B which is enriched in the major component relative to first permeate 214A. In addition, establishing a hydraulic pressure differential across filtration medium 206B can produce second retentate 212B which is enriched in a minor component (e.g., the target minor component) relative to first permeate 214A.

Some embodiment comprise establishing a hydraulic pressure differential across a filtration medium within a third filter receiving at least a portion (or, in some embodiments, all) of the second retentate to produce a third permeate enriched in the major component relative to the second retentate and a third retentate enriched in a minor component (e.g., the target minor component) relative to the second retentate. For example, in the exemplary embodiment of FIG. 2, at least a portion of second retentate 212B from second filter 201B can be transported to third filter 2010. A hydraulic pressure differential can be established across the filtration medium 206C of third filter 201C. Establishing the hydraulic pressure differential across filtration medium 206C can result in at least a portion of the major component being transported across the filtration medium. Accordingly, in some such embodiments, establishing the hydraulic pressure differential across filtration medium 206C can produce third permeate 214C which is enriched in the major component relative to second retentate 212B. In addition, in some embodiments, establishing a hydraulic pressure differential across filtration medium 206C can produce third retentate 212C which is enriched in a minor component (e.g., the target minor component) relative to second retentate 212B.

Certain embodiments comprise recycling at least a portion (e.g., at least about 10 wt %, at least about 25 wt %, at least about 50 wt %, at least about 75 wt %, at least about 90 wt %, at least about 95 wt %, at least about 99 wt %, or all) of the third retentate to the retentate side of the first filter and mixing the portion of the third retentate with at least a portion of the liquid feed. For example, in the exemplary embodiment of FIG. 2, at least a portion (or, in some embodiments, all) of third retentate 212C from third filter 201C can be transported to retentate side 202A of first filter 201A. The portion of third retentate 212C from third filter 201C that is transported to first filter 201A can be mixed with liquid feed 208, for example, before, while, or after they enter retentate side 202A of first filter 201A. In some such embodiments, the mixture of liquid feed 208 and the recycled portion of third retentate 212C can be subjected to filtration within first filter 201A to produce first permeate 214A and first retentate 212A, for example, when system 200 is run as a continuous process (e.g., as a steady state continuous process).

In certain embodiments, the weight percentage of the minor component(s) (e.g., the target minor component) within the third retentate (e.g., stream 212C in FIG. 2) and the weight percentage of the minor component(s) (e.g., the target minor component) within the liquid feed (e.g., stream 208 in FIG. 2) are relatively close. By keeping the concentrations of the target minor components of these streams relatively close, their osmotic pressures may be kept relatively close which, in turn, can reduce the amount of energy wasted during subsequent filtration steps. According to certain embodiments, the lower of the weight percentage of the target minor component in the third retentate and the weight percentage of the target minor component in the liquid feed is at least about 0.5, at least about 0.75, at least about 0.9, at least about 0.95, at least about 0.98, or at least about 0.99 times the higher of the weight percentage of the target minor component in the third retentate and the weight percentage of the target minor component in the liquid feed.

As an exemplary illustration of the above-described comparison, the third retentate could contain the target minor component in an amount of 5.0 wt %, and the liquid feed could contain the target minor component in an amount of 2.5 wt %. In such a case, the higher of the weight percentage of the target minor component in the third retentate and the weight percentage of the target minor component in the liquid feed would be 5.0 wt % (corresponding to the weight percentage of the target minor component in the third retentate). In addition, in such a case, the lower of the weight percentage of the target minor component in the third retentate and the weight percentage of the target minor component in the liquid feed would be 2.5 wt % (corresponding to the weight percentage of the target minor component in the liquid feed). In this case, the lower of the weight percentage of the target minor component in the third retentate and the weight percentage of the target minor component in the liquid feed (2.5 wt %) is 0.5 times the higher of the weight percentage of the target minor component in the third retentate and the weight percentage of the target minor component in the liquid feed (5.0 wt %) (i.e., 2.5 wt % is 0.5 times 5.0 wt %).

In certain embodiments, the osmotic pressure of the third retentate (e.g., stream 212C in FIG. 2) and the osmotic pressure of the liquid feed (e.g., stream 208 in FIG. 2) are relatively close. According to certain embodiments, the lower of the osmotic pressure of the third retentate and the osmotic pressure of the liquid feed is at least about 0.5, at least about 0.75, at least about 0.9, at least about 0.95, at least about 0.98, or at least about 0.99 times the higher of the osmotic pressure of the third retentate and the osmotic pressure of the liquid feed.

Figure 3:
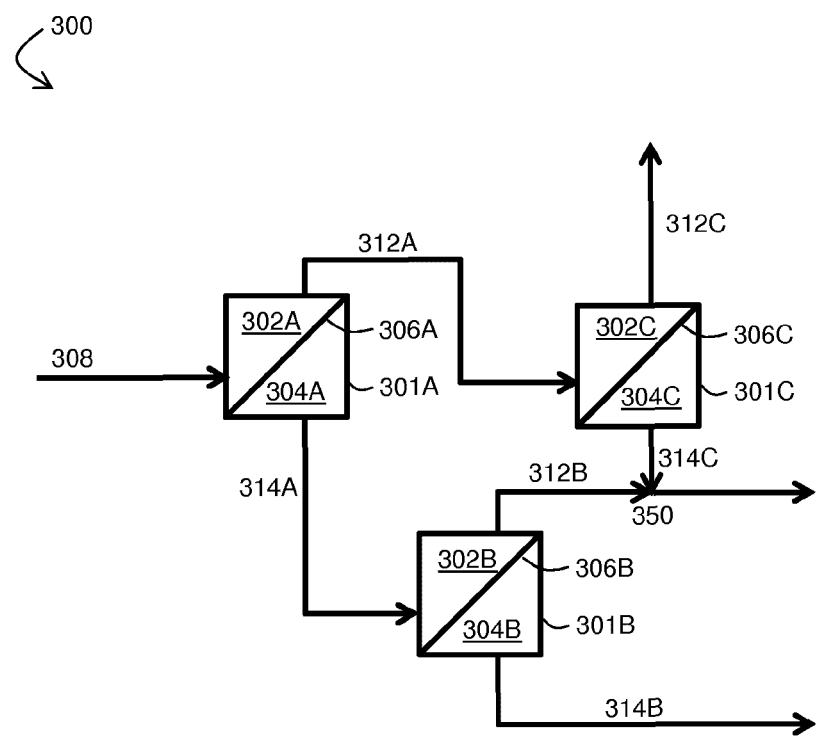
FIG. 3 is a schematic illustration of a filtration system, according to some embodiments, in which filter product streams are mixed.

Another way in which strategic mixing can be employed in certain of the filtration systems described herein is by mixing output streams from multiple filters for subsequent filtration in a downstream filter. FIG. 3 is a schematic illustration of exemplary filtration system 300 in which such a mixing strategy is employed. In some embodiments, the filtration system comprises a first filter comprising a first filtration medium defining a permeate side and a retentate side of the first filter. In some such embodiments, the retentate side of the first filter can be fluidically connected to a liquid feed. For example, in the exemplary embodiment of FIG. 3, system 300 comprises first filter 301A, which comprises first filtration medium 306A defining permeate side 304A and retentate side 302A of first filter 301A. In FIG. 3, retentate side 302A of first filter 301A is fluidically connected to liquid feed 308. Feed stream 308 can contain a liquid mixture including a major component and one or more minor components (one of which may be a target minor component).

In some embodiments, the filtration system comprises a second filter comprising a second filtration medium defining a permeate side and a retentate side of the second filter. In some embodiments, the retentate side of the second filter is fluidically connected to the permeate side of the first filter. For example, in the exemplary embodiment of FIG. 3, system 300 comprises second filter 301B, which comprises second filtration medium 306B defining permeate side 304B and retentate side 302B of second filter 301B. In FIG. 3, retentate side 302B of second filter 301B is fluidically connected to permeate side 304A of first filter 301A via stream 314A.

According to certain embodiments, the filtration system comprises a third filter comprising a third filtration medium defining a permeate side and a retentate side of the third filter. In some embodiments, the retentate side of the third filter is fluidically connected to the retentate side of the first filter. For example, in the non-limiting embodiment of FIG. 3, system 300 comprises third filter 301C, which comprises third filtration medium 306C defining permeate side 304C and retentate side 302C of third filter 301C. In FIG. 3, retentate side 302C of third filter 301C is fluidically connected to retentate side 302A of first filter 301A via stream 312A.

In certain embodiments, the filtration system comprises a fluidic connection between the retentate side of the second filter and the permeate side of the third filter. For example, in the exemplary embodiment of FIG. 3, filtration system 300 comprises streams 312B and 314C, which fluidically connect retentate side 302B of second filter 201B to permeate side 304C of third filter 301C.

While direct fluidic connections are illustrated in the exemplary embodiment of FIG. 3, it should be understood that indirect fluidic connections are also possible. Accordingly, in some embodiments, the permeate side of the first filter and the retentate side of the second filter can be directly fluidically connected, for example, such that no filters are fluidically connected between the permeate side of the first filter and the retentate side of the second filter. In other embodiments, the permeate side of the first filter and the retentate side of the second filter can be indirectly fluidically connected, for example, such that one or more intermediate filters is fluidically connected between the permeate side of the first filter and the retentate side of the second filter. In some embodiments, the retentate side of the second filter and the permeate side of the third filter can be directly fluidically connected, for example, such that no filters are fluidically connected between the retentate side of the second filter and the permeate side of the third filter. In other embodiments, the retentate side of the second filter and the permeate side of the third filter can be indirectly fluidically connected, for example, such that one or more intermediate filters is fluidically connected between the retentate side of the second filter and the permeate side of the third filter.

An exemplary filtration system employing strategic mixing can be operated as follows. Some embodiments comprise establishing a hydraulic pressure differential across a filtration medium within a first filter receiving a liquid feed comprising a major component and a minor component (e.g., the target minor component) to produce a first permeate enriched in the major component relative to the liquid feed and a first retentate enriched in the minor component (e.g., the target minor component) relative to the liquid feed. For example, referring to the exemplary embodiment of FIG. 3, liquid feed stream 308 can be transported to first filter 301A. A hydraulic pressure differential can be established across filtration medium 306A of first filter 301A. Establishing the hydraulic pressure differential across filtration medium 306A can result in at least a portion of the major component being transported across filtration medium 306A. Accordingly, in some such embodiments, establishing a hydraulic pressure differential across filtration medium 306A can produce permeate 314A which is enriched in the major component relative to liquid feed 308. In addition, in some embodiments, establishing a hydraulic pressure differential across filtration medium 306A can produce retentate 312A which is enriched in a minor component (e.g., the target minor component) relative to liquid feed 308.

Certain embodiments comprise establishing a hydraulic pressure differential across a filtration medium within a second filter receiving at least a portion (e.g., at least about 10 wt %, at least about 25 wt %, at least about 50 wt %, at least about 75 wt %, at least about 90 wt %, at least about 95 wt %, at least about 99 wt %, or all) of the first permeate to produce a second permeate enriched in the major component relative to the first permeate and a second retentate enriched in a minor component (e.g., the target minor component) relative to the first permeate. For example, in the exemplary embodiment of FIG. 3, at least a portion (or, in some embodiments, all) of first permeate 314A from first filter 301A can be transported to retentate side 302B of second filter 301B. A hydraulic pressure differential can be established across the filtration medium 306B of second filter 301B. Establishing the hydraulic pressure differential across filtration medium 306B can result in at least a portion of the major component being transported across filtration medium 306B. Accordingly, in some such embodiments, establishing a hydraulic pressure differential across filtration medium 306B can produce second permeate 314B which is enriched in the major component relative to first permeate 314A. In addition, in some embodiments, establishing a hydraulic pressure differential across filtration medium 306B can produce second retentate 312B which is enriched in a minor component (e.g., the target minor component) relative to first permeate 314A.

Some embodiments comprise establishing a hydraulic pressure differential across a filtration medium within a third filter receiving at least a portion (e.g., at least about 10 wt %, at least about 25 wt %, at least about 50 wt %, at least about 75 wt %, at least about 90 wt %, at least about 95 wt %, at least about 99 wt %, or all) of the first retentate to produce a third permeate enriched in the major component relative to the first retentate and a third retentate enriched in a minor component (e.g., the target minor component) relative to the first retentate. For example, in the exemplary embodiment of FIG. 3, at least a portion of first retentate 312A from first filter 301A can be transported to third filter 301C. A hydraulic pressure differential can be established across the filtration medium 306C of third filter 301C. Establishing a hydraulic pressure differential across filtration medium 306C can result in at least a portion of the major component being transported across filtration medium 306C. Accordingly, in some such embodiments, establishing a hydraulic pressure differential across filtration medium 306C can produce third permeate 314C which is enriched in the major component relative to first retentate 312A. In addition, in some embodiments, establishing a hydraulic pressure differential across filtration medium 306C can produce third retentate 312C which is enriched in a minor component (e.g., the target minor component) relative to first retentate 312A.

Certain embodiments comprise mixing at least a portion of the second retentate (e.g., at least about 10 wt %, at least about 25 wt %, at least about 50 wt %, at least about 75 wt %, at least about 90 wt %, at least about 95 wt %, at least about 99 wt %, or all of the second retentate) with at least a portion of the third permeate (e.g., at least about 10 wt %, at least about 25 wt %, at least about 50 wt %, at least about 75 wt %, at least about 90 wt %, at least about 95 wt %, at least about 99 wt %, or all of the third permeate). For example, in the exemplary embodiment of FIG. 3, at least a portion of second retentate 312B from second filter 301B can be mixed with at least a portion of third permeate 314C at mixing region 350. In certain embodiments, mixing region 350 can correspond to a junction of conduits, as illustrated in FIG. 3. In some embodiments, mixing region 350 can be contained within the retentate side of a downstream filter, such as fourth filter 301D shown in FIG. 4 and described in more detail below.

In certain embodiments, the weight percentage of the minor component(s) (e.g., the target minor component) within the second retentate (e.g., stream 312B in FIG. 3) and the weight percentage of the minor component(s) (e.g., the target minor component) within the third permeate (e.g., stream 314C in FIG. 3) are relatively close. By keeping the concentrations of the minor components of these streams relatively close, their osmotic pressures may be kept relatively close which, in turn, can reduce the amount of energy wasted during subsequent filtration. According to certain embodiments, the lower of the weight percentage of the target minor component in the second retentate and the weight percentage of the target minor component in the third permeate is at least about 0.5, at least about 0.75, at least about 0.9, at least about 0.95, at least about 0.98, or at least about 0.99 times the higher of the weight percentage of the target minor component in the second retentate and the weight percentage of the target minor component in the third permeate.

As an exemplary illustration of the above-described comparison, the second retentate could contain the target minor component in an amount of 5.0 wt %, and the third permeate could contain the target minor component in an amount of 2.5 wt %. In such a case, the higher of the weight percentage of the target minor component in the second retentate and the weight percentage of the target minor component in the third permeate would be 5.0 wt % (corresponding to the weight percentage of the target minor component in the second retentate). In addition, in such a case, the lower of the weight percentage of the target minor component in the second retentate and the weight percentage of the target minor component in the third permeate would be 2.5 wt % (corresponding to the weight percentage of the target minor component in the third permeate). In this case, the lower of the weight percentage of the target minor component in the second retentate and the weight percentage of the target minor component in the third permeate (2.5 wt %) is 0.5 times the higher of the weight percentage of the target minor component in the second retentate and the weight percentage of the target minor component in the third permeate (5.0 wt %) (i.e., 2.5 wt % is 0.5 times 5.0 wt %).

In certain embodiments, the osmotic pressure of the second retentate (e.g., stream 312B in FIG. 3) and the osmotic pressure of the third permeate (e.g., stream 314C in FIG. 3) are relatively close. According to certain embodiments, the lower of the osmotic pressure of the second retentate and the osmotic pressure of the third permeate is at least about 0.5, at least about 0.75, at least about 0.9, at least about 0.95, at least about 0.98, or at least about 0.99 times the higher of the osmotic pressure of the second retentate and the osmotic pressure of the third permeate.

In certain embodiments, a mixture of the second retentate portion and the third permeate portion can be processed within an optional fourth filter. In some such embodiments, a hydraulic pressure differential can be established across a filtration medium of the optional fourth filter to produce a permeate stream enriched in the major component relative to the mixture of the second retentate portion and the third permeate portion and a retentate stream that is enriched in the minor component (e.g., the target minor component) relative to the mixture of the second retentate portion and the third permeate portion.

Figure 4:
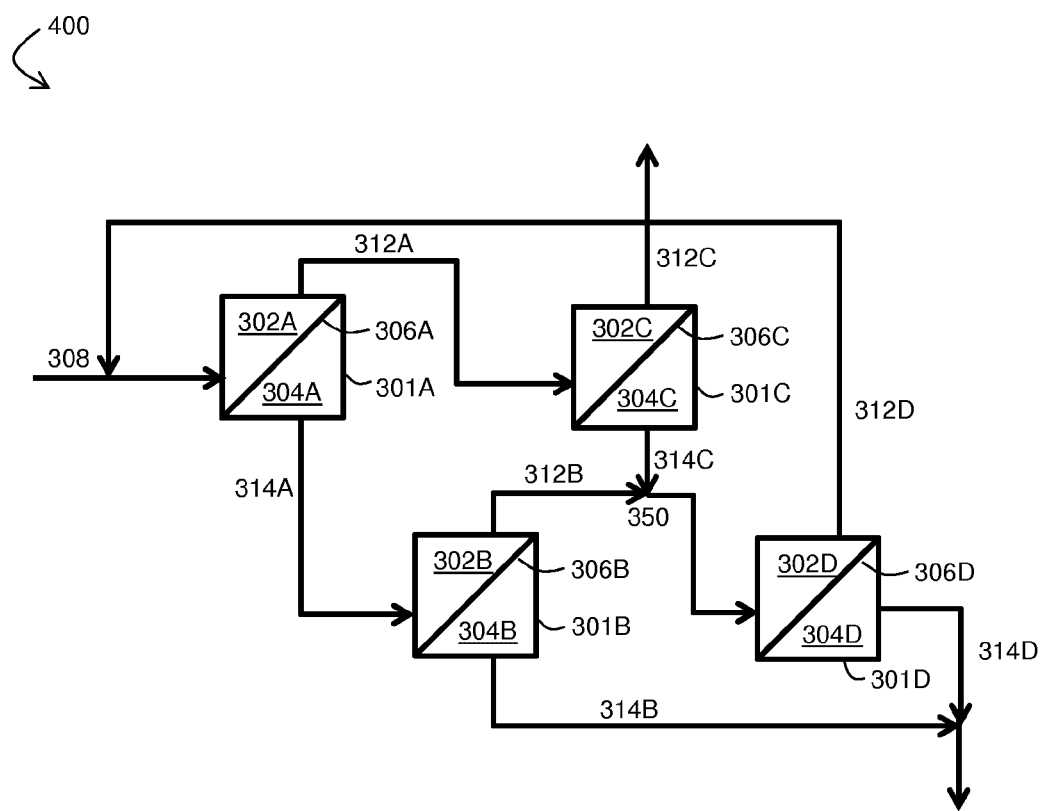
FIG. 4 is an exemplary schematic illustration of a filtration system, according to certain embodiments.

Accordingly, in some embodiments, the filtration system comprises an optional fourth filter comprising a fourth filtration medium defining a permeate side and a retentate side of the fourth filter. In some embodiments, the retentate side of the fourth filter is fluidically connected to the retentate side of the second filter and the permeate side of the third filter. FIG. 4 is a schematic illustration of one such non-limiting system 400, in which system 300 shown in FIG. 3 has been modified to include optional fourth filter 301D. In the exemplary embodiment of FIG. 4, fourth filter 301D comprises filtration medium 306D defining permeate side 304D and retentate side 302D of fourth filter 301D. In FIG. 4, retentate side 302D of optional fourth filter 301D is fluidically connected to retentate side 302B of second filter 301B (via stream 312B). In addition, retentate side 302D of optional fourth filter 301D is fluidically connected to permeate side 304C of third filter 301C (via stream 314C). While the exemplary embodiment of FIG. 4 shows the retentate side of the second filter and the permeate side of the third filter being mixed prior to being transported to the retentate side of the optional fourth filter, in other embodiments, the retentate side of the second filter and the permeate side of the third filter can be transported separately to the retentate side of the optional fourth filter and mixed within the retentate side of the optional fourth filter.

Certain embodiments comprise establishing a hydraulic pressure differential across the filtration medium of the fourth filter when the fourth filter receives at least a portion (e.g., at least about 10 wt %, at least about 25 wt %, at least about 50 wt %, at least about 75 wt %, at least about 90 wt %, at least about 95 wt %, at least about 99 wt %, or all) of the mixture of the second retentate and the third permeate. In some embodiments, establishing a hydraulic pressure differential across the filtration medium of the fourth filter produces a fourth permeate enriched in the major component relative to the mixture of the second retentate and the third permeate and a fourth retentate enriched in a minor component (e.g., the target minor component) relative to the mixture of the second retentate and the third permeate. For example, referring to the exemplary embodiment of FIG. 4, at least a portion of second retentate stream 312B can be transported to retentate side 302D of fourth filter 301D. In addition, at least a portion of third permeate stream 314C can be transported to retentate side 302D of fourth filter 301D. In some embodiments, a hydraulic pressure differential is established across filtration medium 306D of fourth filter 301D to produce fourth permeate 314D enriched in the major component relative to the mixture of the second retentate and the third permeate. In addition, the hydraulic pressure differential established across filtration medium 306D of fourth filter 301D can produce fourth retentate 312D enriched in the minor component (e.g., the target minor component) relative to the mixture of the second retentate and the third permeate.

According to certain embodiments, strategic mixing and strategic recycling can both be present within the filtration system. For example, in some embodiments, the filtration system comprises a fluidic connection between the retentate side of the optional fourth filter and the retentate side of the first filter. Referring to the exemplary embodiment of FIG. 4, for example, retentate side 302D of optional fourth filter 301D can be fluidically connected to retentate side 302A of first filter 301A via stream 312D. While the exemplary embodiment of FIG. 4 shows stream 312D being merged with liquid feed 308 prior to being transported to retentate side 302A of filter 301A, in other embodiments, stream 312D and 308 can be transported separately (e.g., via separate inlets) to retentate side 302A of filter 301A.

While direct fluidic connections are illustrated between the second and fourth filters and between the third and fourth filters in the exemplary embodiment of FIG. 4, it should be understood that indirect fluidic connections are also possible. Accordingly, in some embodiments, the retentate side of the second filter and the retentate side of the fourth filter can be directly fluidically connected, for example, such that no filters are fluidically connected between the retentate side of the second filter and the retentate side of the fourth filter. In other embodiments, the retentate side of the second filter and the retentate side of the fourth filter can be indirectly fluidically connected, for example, such that one or more intermediate filters is fluidically connected between the retentate side of the second filter and the retentate side of the fourth filter. In some embodiments, the permeate side of the third filter and the retentate side of the fourth filter can be directly fluidically connected, for example, such that no filters are fluidically connected between the permeate side of the third filter and the retentate side of the fourth filter. In other embodiments, the permeate side of the third filter and retentate side of the fourth filter can be indirectly fluidically connected, for example, such that one or more intermediate filters is fluidically connected between the permeate side of the third filter and the retentate side of the fourth filter.

In certain embodiments, the weight percentage of the minor component(s) (e.g., the target minor component) within the fourth retentate (e.g., stream 312D in FIG. 4) and the weight percentage of the minor component(s) (e.g., the target minor component) within the liquid feed (e.g., stream 308 in FIG. 4) are relatively close. By keeping the concentrations of the target minor components of these streams relatively close, their osmotic pressures may be kept relatively close which, in turn, can reduce the amount of energy wasted during subsequent filtration. According to certain embodiments, the lower of the weight percentage of the target minor component in the fourth retentate and the weight percentage of the target minor component in the liquid feed is at least about 0.5, at least about 0.75, at least about 0.9, at least about 0.95, at least about 0.98, or at least about 0.99 times the higher of the weight percentage of the target minor component in the fourth retentate and the weight percentage of the target minor component in the liquid feed.

As an exemplary illustration of the above-described comparison, the fourth retentate could contain the target minor component in an amount of 5.0 wt %, and the liquid feed could contain the target minor component in an amount of 2.5 wt %. In such a case, the higher of the weight percentage of the target minor component in the fourth retentate and the weight percentage of the target minor component in the liquid feed would be 5.0 wt % (corresponding to the weight percentage of the target minor component in the fourth retentate). In addition, in such a case, the lower of the weight percentage of the target minor component in the fourth retentate and the weight percentage of the target minor component in the liquid feed would be 2.5 wt % (corresponding to the weight percentage of the target minor component in the liquid feed). In this case, the lower of the weight percentage of the target minor component in the fourth retentate and the weight percentage of the target minor component in the liquid feed (2.5 wt %) is 0.5 times the higher of the weight percentage of the target minor component in the fourth retentate and the weight percentage of the target minor component in the liquid feed (5.0 wt %) (i.e., 2.5 wt % is 0.5 times 5.0 wt %).

In certain embodiments, the osmotic pressure of the fourth retentate (e.g., stream 312D in FIG. 4) and the osmotic pressure of the liquid feed (e.g., stream 308 in FIG. 4) are relatively close. According to certain embodiments, the lower of the osmotic pressure of the fourth retentate and the osmotic pressure of the liquid feed is at least about 0.5, at least about 0.75, at least about 0.9, at least about 0.95, at least about 0.98, or at least about 0.99 times the higher of the osmotic pressure of the fourth retentate and the osmotic pressure of the liquid feed.

In some embodiments, more than four filters (e.g., at least a fifth filter, at least a sixth filter, or more) may be used in the filtration system. In some such embodiments, the filtration system comprises more than one stream from a downstream filter that is recycled back to an upstream filter. In some embodiments, the filtration system comprises more than one mixing region at which two product streams having similar concentrations of a minor component(s) are mixed prior to subsequent filtration.

Figure 5:
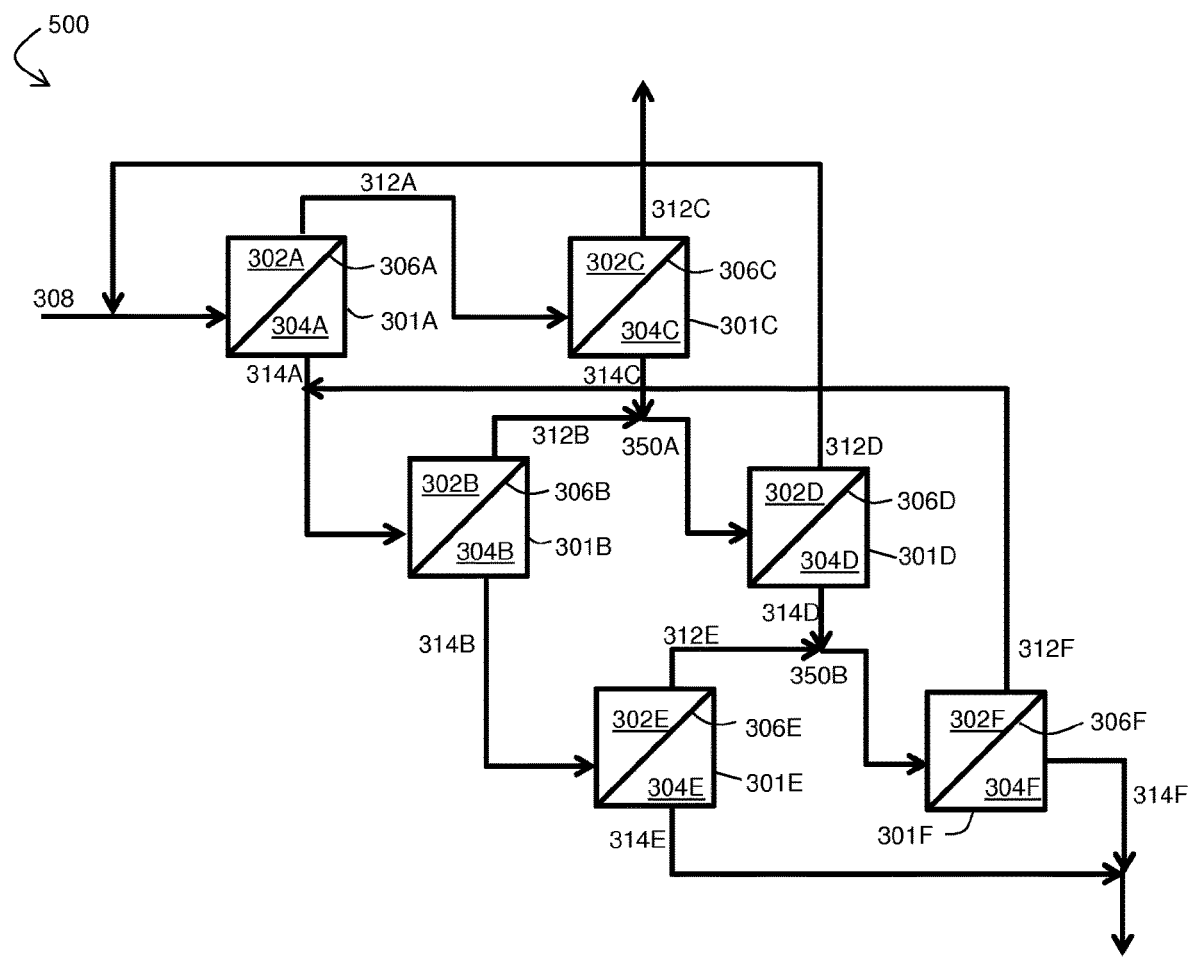
FIG. 5 is, according to some embodiments, a schematic illustration of a filtration system.

FIG. 5 is a schematic illustration of an exemplary filtration system 500 comprising fifth filter 301E and sixth filter 301F. The exemplary embodiment illustrated in FIG. 5, also includes first filter 301A, second filter 301B, third filter 301C, and fourth filter 301D, arranged as illustrated in FIG. 4. In the exemplary embodiment of FIG. 5, fifth filter 301E comprises filtration medium 306E defining retentate side 302E and permeate side 304E of filter 301E. In FIG. 5, sixth filter 301F comprises filtration medium 306F defining retentate side 302F and permeate side 304F of filter 301F. Filter 301E can be configured, in some embodiments, to receive at least a portion (e.g., at least about 10 wt %, at least about 25 wt %, at least about 50 wt %, at least about 75 wt %, at least about 90 wt %, at least about 95 wt %, at least about 99 wt %, or all) of second permeate 314B and to produce fifth retentate 312E and fifth permeate 314E. Filter 301F can be configured, in certain embodiments, to receive at least a portion (e.g., at least about 10 wt %, at least about 25 wt %, at least about 50 wt %, at least about 75 wt %, at least about 90 wt %, at least about 95 wt %, at least about 99 wt %, or all) of fifth retentate 312E and/or fourth permeate 314D, and to produce sixth retentate 312F and sixth permeate 314F.

The filtration system illustrated in FIG. 5 can include multiple recycle streams. For example, in some embodiments, stream 312D in FIG. 5 is recycled back to liquid feed 308, as described above with respect to FIG. 4. In some embodiments, at least a portion (e.g., at least about 10 wt %, at least about 25 wt %, at least about 50 wt %, at least about 75 wt %, at least about 90 wt %, at least about 95 wt %, at least about 99 wt %, or all) of sixth retentate 312F can be mixed with at least a portion (e.g., at least about 10 wt %, at least about 25 wt %, at least about 50 wt %, at least about 75 wt %, at least about 90 wt %, at least about 95 wt %, at least about 99 wt %, or all) of first permeate 314A. In some such embodiments, the weight percentage of the minor component(s) (e.g., the target minor component) within the sixth retentate and the weight percentage of the minor component(s) (e.g., the target minor component) within the first permeate are relatively close. For example, according to certain embodiments, the lower of the weight percentage of the target minor component in the sixth retentate and the weight percentage of the target minor component in the first permeate is at least about 0.5, at least about 0.75, at least about 0.9, at least about 0.95, at least about 0.98, or at least about 0.99 times the higher of the weight percentage of the target minor component in the sixth retentate and the weight percentage of the target minor component in the first permeate. In some embodiments, the osmotic pressure of the sixth retentate and the osmotic pressure of the first permeate are relatively close. For example, according to certain embodiments, the lower of the osmotic pressure of the sixth retentate and the osmotic pressure of the first permeate is at least about 0.5, at least about 0.75, at least about 0.9, at least about 0.95, at least about 0.98, or at least about 0.99 times the higher of the osmotic pressure of the sixth retentate and the osmotic pressure of the first permeate.

The filtration system illustrated in FIG. 5 can include multiple mixing regions, according to certain embodiments, in addition to or in place of the multiple recycle streams. For example, in some embodiments, streams 312B and 314C in FIG. 5 can be mixed at mixing region 350A, as described above with respect to FIGS. 3-4. In some embodiments, at least a portion (e.g., at least about 10 wt %, at least about 25 wt %, at least about 50 wt %, at least about 75 wt %, at least about 90 wt %, at least about 95 wt %, at least about 99 wt %, or all) of fifth retentate 312E can be mixed with at least a portion (e.g., at least about 10 wt %, at least about 25 wt %, at least about 50 wt %, at least about 75 wt %, at least about 90 wt %, at least about 95 wt %, at least about 99 wt %, or all) of fourth permeate 314D at mixing region 350B. In some such embodiments, the weight percentage of the minor component(s) (e.g., the target minor component) within the fifth retentate (e.g., stream 312E) and the weight percentage of the minor component(s) (e.g., the target minor component) within the fourth permeate (e.g., stream 314D) are relatively close. For example, according to certain embodiments, the lower of the weight percentage of the target minor component in the fifth retentate and the weight percentage of the target minor component in the fourth permeate is at least about 0.5, at least about 0.75, at least about 0.9, at least about 0.95, at least about 0.98, or at least about 0.99 times the higher of the weight percentage of the target minor component in the fifth retentate and the weight percentage of the target minor component in the fourth permeate. In some embodiments, the osmotic pressure of the fifth retentate and the osmotic pressure of the fourth permeate are relatively close. For example, according to certain embodiments, the lower of the osmotic pressure of the fifth retentate and the osmotic pressure of the fourth permeate is at least about 0.5, at least about 0.75, at least about 0.9, at least about 0.95, at least about 0.98, or at least about 0.99 times the higher of the osmotic pressure of the sixth retentate and the osmotic pressure of the first permeate.

Figure 6:
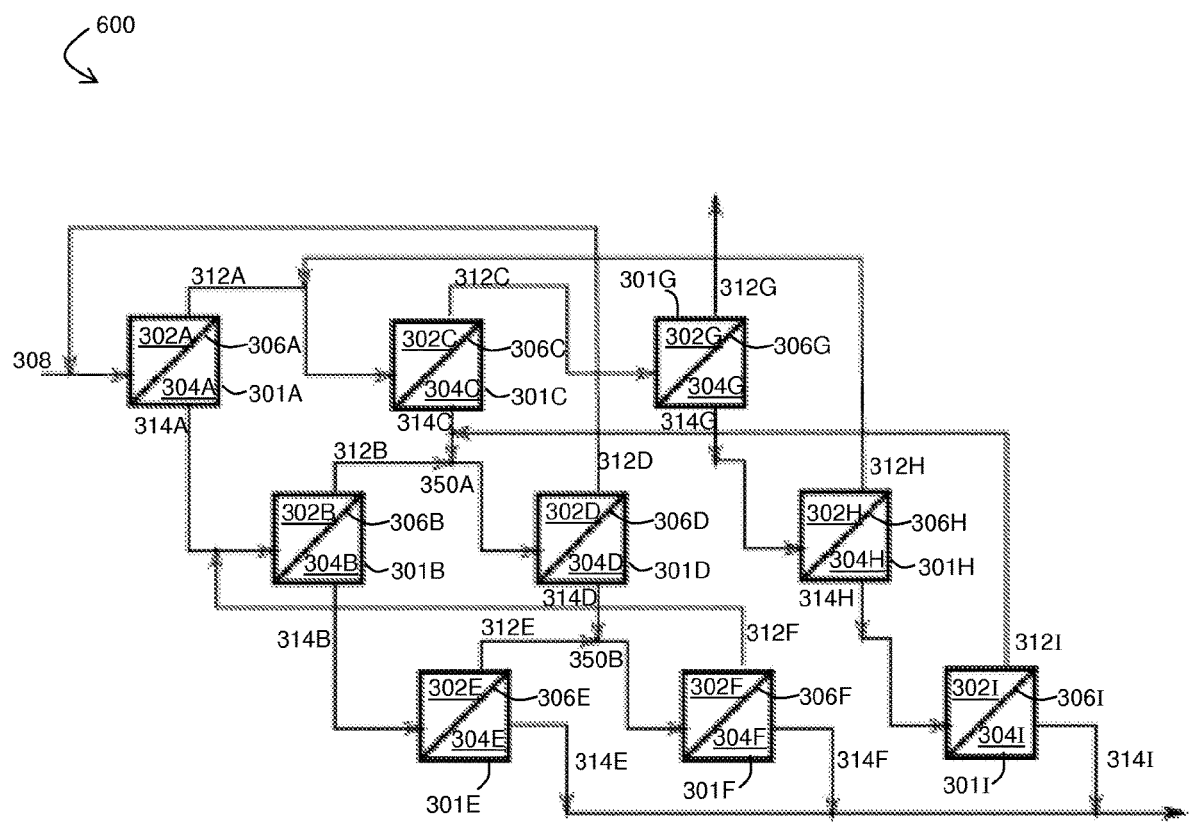
FIG. 6 is a schematic illustration of a filtration system, according to certain embodiments.

FIG. 6 is a schematic illustration of an exemplary filtration system 600 comprising seventh filter 301G, eighth filter 301H, and ninth filter 301I. The exemplary embodiment illustrated in FIG. 6, also includes first filter 301A, second filter 301B, third filter 301C, fourth filter 301D, fifth filter 301E, and sixth filter 301F, arranged as illustrated in FIG. 5. In the exemplary embodiment of FIG. 6, seventh filter 301G comprises filtration medium 306G defining retentate side 302G and permeate side 304G of filter 301G. Filter 301G can be configured, in some embodiments, to receive at least a portion (e.g., at least about 10 wt %, at least about 25 wt %, at least about 50 wt %, at least about 75 wt %, at least about 90 wt %, at least about 95 wt %, at least about 99 wt %, or all) of third retentate 312C and to produce seventh retentate 312E and seventh permeate 314G. In FIG. 6, eighth filter 301H comprises filtration medium 306H defining retentate side 302H and permeate side 304H of filter 301H. Filter 301H can be configured, in some embodiments, to receive at least a portion (e.g., at least about 10 wt %, at least about 25 wt %, at least about 50 wt %, at least about 75 wt %, at least about 90 wt %, at least about 95 wt %, at least about 99 wt %, or all) of seventh permeate 314G and to produce eighth retentate 312H and eighth permeate 314H. In FIG. 6, ninth filter 301I comprises filtration medium 306I defining retentate side 302I and permeate side 304I of filter 301I. Ninth filter 301I can be configured, in some embodiments, to receive at least a portion (e.g., at least about 10 wt %, at least about 25 wt %, at least about 50 wt %, at least about 75 wt %, at least about 90 wt %, at least about 95 wt %, at least about 99 wt %, or all) of eighth permeate 314H and to produce ninth retentate 312I and ninth permeate 314I.

The filtration system illustrated in FIG. 6 can include multiple recycle streams. For example, in some embodiments, at least a portion (e.g., at least about 10 wt %, at least about 25 wt %, at least about 50 wt %, at least about 75 wt %, at least about 90 wt %, at least about 95 wt %, at least about 99 wt %, or all) of stream 312D in FIG. 6 is recycled back to liquid feed 308, as described above with respect to FIGS. 4-5. In some embodiments, at least a portion (e.g., at least about 10 wt %, at least about 25 wt %, at least about 50 wt %, at least about 75 wt %, at least about 90 wt %, at least about 95 wt %, at least about 99 wt %, or all) of sixth retentate 312F can be mixed with at least a portion of first permeate 314A, as described above with respect to FIG. 5. In some embodiments, at least a portion (e.g., at least about 10 wt %, at least about 25 wt %, at least about 50 wt %, at least about 75 wt %, at least about 90 wt %, at least about 95 wt %, at least about 99 wt %, or all) of eighth retentate 312H can be mixed with at least a portion (e.g., at least about 10 wt %, at least about 25 wt %, at least about 50 wt %, at least about 75 wt %, at least about 90 wt %, at least about 95 wt %, at least about 99 wt %, or all) of first retentate 312A. In some such embodiments, the lower of the weight percentage of the target minor component in eighth retentate 312H and the weight percentage of the target minor component in first retentate 312A is at least about 0.5, at least about 0.75, at least about 0.9, at least about 0.95, at least about 0.98, or at least about 0.99 times the higher of the weight percentage of the target minor component in eighth retentate 312H and the weight percentage of the target minor component first retentate 312A. In some embodiments, the lower of the osmotic pressure of eighth retentate 312H and the osmotic pressure of first retentate 312A is at least about 0.5, at least about 0.75, at least about 0.9, at least about 0.95, at least about 0.98, or at least about 0.99 times the higher of the osmotic pressure of eighth retentate 312H and the osmotic pressure of first retentate 312A.

In some embodiments, at least a portion (e.g., at least about 10 wt %, at least about 25 wt %, at least about 50 wt %, at least about 75 wt %, at least about 90 wt %, at least about 95 wt %, at least about 99 wt %, or all) of ninth retentate 312I can be mixed with at least a portion (e.g., at least about 10 wt %, at least about 25 wt %, at least about 50 wt %, at least about 75 wt %, at least about 90 wt %, at least about 95 wt %, at least about 99 wt %, or all) of third permeate 314C. In some such embodiments, the lower of the weight percentage of the target minor component in ninth retentate 312I and the weight percentage of the target minor component in third permeate 314C is at least about 0.5, at least about 0.75, at least about 0.9, at least about 0.95, at least about 0.98, or at least about 0.99 times the higher of the weight percentage of the target minor component in ninth retentate 312I and the weight percentage of the target minor component in third permeate 314C. In some embodiments, the lower of the osmotic pressure of ninth retentate 312I and the osmotic pressure of third permeate 314C is at least about 0.5, at least about 0.75, at least about 0.9, at least about 0.95, at least about 0.98, or at least about 0.99 times the higher of the osmotic pressure of ninth retentate 312I and the osmotic pressure of third permeate 314C.

The filtration system illustrated in FIG. 6 can include, according to certain embodiments, multiple mixing regions 350A and 350B as described, for example, with respect to FIG. 5 above.

Figure 7:
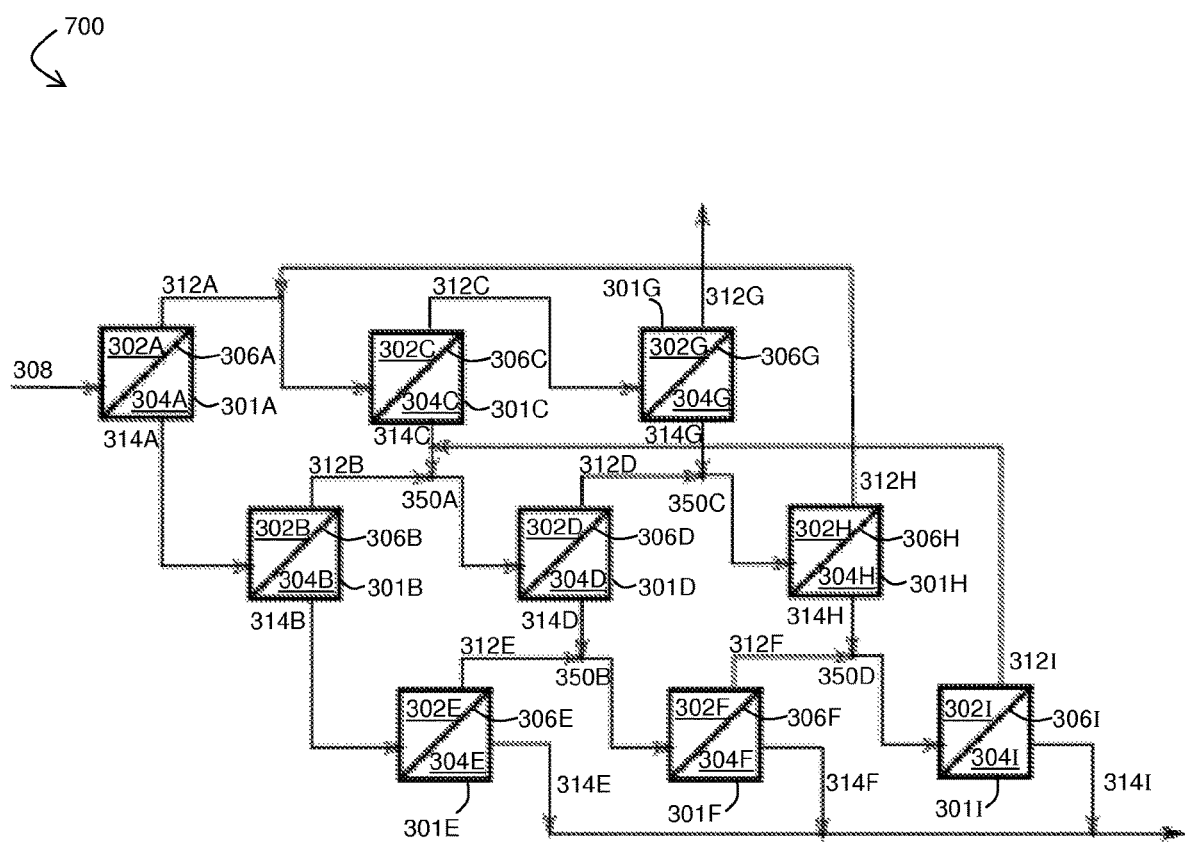
FIG. 7 is a schematic illustration of an exemplary filtration system, in accordance with certain embodiments.

FIG. 7 is a schematic illustration of an exemplary filtration system 700 comprising seventh filter 301G, eighth filter 301H, and ninth filter 301I. The exemplary embodiment illustrated in FIG. 7, also includes first filter 301A, second filter 301B, third filter 301C, fourth filter 301D, fifth filter 301E, and sixth filter 301F. In the exemplary embodiment of FIG. 7, seventh filter 301G comprises filtration medium 306G defining retentate side 302G and permeate side 304G of filter 301G. Filter 301G can be configured, in some embodiments, to receive at least a portion (e.g., at least about 10 wt %, at least about 25 wt %, at least about 50 wt %, at least about 75 wt %, at least about 90 wt %, at least about 95 wt %, at least about 99 wt %, or all) of third retentate 312C, and to produce seventh retentate 312G and seventh permeate 314G. In FIG. 7, eighth filter 301H comprises filtration medium 306H defining retentate side 302H and permeate side 304H of filter 301H. Filter 301H can be configured, in some embodiments, to receive at least a portion (e.g., at least about 10 wt %, at least about 25 wt %, at least about 50 wt %, at least about 75 wt %, at least about 90 wt %, at least about 95 wt %, at least about 99 wt %, or all) of fourth retentate 312D and/or seventh permeate 314G, and to produce eighth retentate 312H and eighth permeate 314H. In FIG. 7, ninth filter 301I comprises filtration medium 306I defining retentate side 302I and permeate side 304I of filter 301I. Filter 301I can be configured, in some embodiments, to receive at least a portion (e.g., at least about 10 wt %, at least about 25 wt %, at least about 50 wt %, at least about 75 wt %, at least about 90 wt %, at least about 95 wt %, at least about 99 wt %, or all) of eighth permeate 314H and/or sixth retentate 312F, and to produce ninth retentate 312I and ninth permeate 314I.

The filtration system illustrated in FIG. 7 can include multiple mixing regions. For example, in some embodiments, at least portions of streams 312B and 314C in FIG. 7 can be mixed at mixing region 350A, as described above with respect to FIGS. 3-4. In some embodiments, at least a portion (e.g., at least about 10 wt %, at least about 25 wt %, at least about 50 wt %, at least about 75 wt %, at least about 90 wt %, at least about 95 wt %, at least about 99 wt %, or all) of fifth retentate 312E can be mixed with at least a portion (e.g., at least about 10 wt %, at least about 25 wt %, at least about 50 wt %, at least about 75 wt %, at least about 90 wt %, at least about 95 wt %, at least about 99 wt %, or all) of fourth permeate 314D at mixing region 350B, as described above with respect to FIG. 5. In some embodiments, at least a portion (e.g., at least about 10 wt %, at least about 25 wt %, at least about 50 wt %, at least about 75 wt %, at least about 90 wt %, at least about 95 wt %, at least about 99 wt %, or all) of fourth retentate 312D can be mixed with at least a portion (e.g., at least about 10 wt %, at least about 25 wt %, at least about 50 wt %, at least about 75 wt %, at least about 90 wt %, at least about 95 wt %, at least about 99 wt %, or all) of seventh permeate 314G at mixing region 350C. In some such embodiments, the lower of the weight percentage of the target minor component in fourth retentate 312D and the weight percentage of the target minor component in seventh permeate 314G is at least about 0.5, at least about 0.75, at least about 0.9, at least about 0.95, at least about 0.98, or at least about 0.99 times the higher of the weight percentage of the target minor component in fourth retentate 312D and the weight percentage of the target minor component in seventh permeate 314G. In some embodiments, the lower of the osmotic pressure of fourth retentate 312D and the osmotic pressure of seventh permeate 314G is at least about 0.5, at least about 0.75, at least about 0.9, at least about 0.95, at least about 0.98, or at least about 0.99 times the higher of the osmotic pressure of fourth retentate 312D and the osmotic pressure of seventh permeate 314G.

In some embodiments, at least a portion (e.g., at least about 10 wt %, at least about 25 wt %, at least about 50 wt %, at least about 75 wt %, at least about 90 wt %, at least about 95 wt %, at least about 99 wt %, or all) of sixth retentate 312F can be mixed with at least a portion (e.g., at least about 10 wt %, at least about 25 wt %, at least about 50 wt %, at least about 75 wt %, at least about 90 wt %, at least about 95 wt %, at least about 99 wt %, or all) of eighth permeate 314H at mixing region 350D. In some such embodiments, the lower of the weight percentage of the target minor component sixth retentate 312F and the weight percentage of the target minor component in eighth permeate 314H is at least about 0.5, at least about 0.75, at least about 0.9, at least about 0.95, at least about 0.98, or at least about 0.99 times the higher of the weight percentage of the target minor component in sixth retentate 312F and the weight percentage of the target minor component in eighth permeate 314H. In some embodiments, the lower of the osmotic pressure of sixth retentate 312F and the osmotic pressure of eighth permeate 314H is at least about 0.5, at least about 0.75, at least about 0.9, at least about 0.95, at least about 0.98, or at least about 0.99 times the higher of the osmotic pressure of sixth retentate 312F and the osmotic pressure of eighth permeate 314H.

The filtration system illustrated in FIG. 7 can include, according to certain embodiments, multiple recycle streams (e.g., streams 312H and/or 312I) as described, for example, with respect to FIG. 6 above.

Certain of the systems and methods described herein can be used to concentrate one or more minor components within a variety of types of liquid feeds (e.g., liquid mixtures fed to the system, for example, via streams 108, 208, and/or 308 in FIGS. 1-7).

The liquid feed can comprise a number of suitable major components. In certain embodiments, the major component is a liquid. For example, the major component can be a consumable liquid. According to certain embodiments, the major component is non-ionic (i.e., the major component does not have a net ionic charge). The major component can have a molecular weight of less than about 150 g/mol, less than about 100 g/mol, less than about 50 g/mol, or less than 25 g/mol, according to some embodiments. For example, in some embodiments, the major component is water. In some embodiments, the major component can be a solvent.

The liquid feed can contain a number of suitable minor components. As noted above, certain liquid feed mixtures can include exactly one minor component while other mixtures may contain more than one minor component. In certain embodiments, at least one (or all) of the minor components (e.g., the target minor component) is a liquid. For example, at least one (or all) of the minor components (e.g., the target minor component) can be a consumable liquid. According to certain embodiments, at least one (or all) of the minor components (e.g., the target minor component) is non-ionic (i.e., the minor component does not have a net ionic charge). According to some embodiments, at least one (or all) of the minor components (e.g., the target minor component) can have a molecular weight of less than about 150 g/mol, less than about 100 g/mol, or less than about 50 g/mol (and/or, in some embodiments, at least about 25 g/mol, at least about 35 g/mol, or at least about 40 g/mol). In some embodiments, at least one of the minor components is an alcohol, such as ethanol.

In some embodiments, the target minor component is a co-solvent with the major component. For example, in some embodiments, ethanol can act as a co-solvent with water, for example, dissolving one or more salts within the liquid feed. In other embodiments, the target minor component does not act as a solvent.

According to certain embodiments, the liquid feed containing the major component and the minor component(s) can be a consumable mixture. In some embodiments, the liquid feed is an aqueous mixture. In some embodiments, the liquid feed comprises water as the major component and ethanol as a minor component (e.g., the target minor component). In some embodiments in which water and ethanol are components of the liquid feed, the liquid feed can further comprise one or more sugars. According to certain embodiments, the liquid feed is an alcoholic beverage, such as beer, wine, and the like. In some, but not necessarily all, cases the systems and methods described herein can be particularly advantageous in producing concentrates of beer.

In certain embodiments, the concentration of at least one minor component (e.g., the target minor component) in the liquid feed is relatively high. For example, in certain embodiments, the concentration of a minor component (e.g., the target minor component) in the liquid feed (e.g., in streams 108, 208, and/or 308 of FIGS. 1-7) is at least about 0.001% by weight, at least about 0.01% by weight, at least about 0.1% by weight, or at least about 1% by weight (and/or, in certain embodiments, up to about 5% by weight, up to about 10% by weight, up to about 15% by weight, up to about 20% by weight, or more). Such relatively high concentrations of a minor component(s) can be observed, for example, in systems for the concentration of alcoholic beverages (e.g., beer, wine, and the like). The use of high minor component concentrations is not required, however, and in some embodiments, the concentration of a minor component (e.g., the target minor component) in the liquid feed can be as low as 0.0001% by weight, as low as 0.00001% by weight, or lower.

According to certain embodiments, the minor component(s) (e.g., the target minor component) is a component that is not highly rejected by traditional filtration media, such as reverse osmosis membranes, nanofiltration membranes, and/or ultrafiltration membranes. Thus, in some embodiments, the rejection percentage (the calculation of which for particular minor components is described below) of one or more filtration media with respect to a minor component (e.g., the target minor component) can be relatively low. According to certain embodiments, the rejection percentage of the minor component (e.g., the target minor component) with respect to a filtration medium within a filter of the filtration system is between about 10% and about 95%, between about 35% and about 90%, or between about 60% and about 90%. In some embodiments, the rejection percentage of the minor component (e.g., the target minor component) with respect to a filtration medium within a filter of the filtration system is between about 10% and about 99% or between about 95% and about 99%. For example, in some embodiments, the rejection percentage of the minor component (e.g., the target minor component) with respect to the first filtration medium of the first filter of the filtration system (e.g., filtration medium 206A of filter 201A in FIG. 2 and/or filtration medium 306A of filter 301A in FIGS. 3-7) is between about 10% and about 99%, between about 10% and about 95%, between about 35% and about 90%, or between about 60% and about 90%. In certain embodiments, the rejection percentage of the minor component (e.g., the target minor component) with respect to the second filtration medium of the second filter of the filtration system (e.g., filtration medium 206B of filter 201B in FIG. 2 and/or filtration medium 306B of filter 301B in FIGS. 3-7) is between about 10% and about 99%, between about 10% and about 95%, between about 35% and about 90%, or between about 60% and about 90%. In some embodiments, the rejection percentage of the minor component (e.g., the target minor component) with respect to the third filtration medium of the third filter of the filtration system (e.g., filtration medium 206C of filter 201C in FIG. 2 and/or filtration medium 306C of filter 301C of FIGS. 3-7) is between about 10% and about 99%, between about 10% and about 95%, between about 35% and about 90%, or between about 60% and about 90%. According to certain embodiments, the rejection percentage of the minor component (e.g., the target minor component) with respect to the fourth filtration medium of the fourth filter of the filtration system (e.g., filtration medium 306D of filter 301D in FIGS. 4-7) is between about 10% and about 99%, between about 10% and about 95%, between about 35% and about 90%, or between about 60% and about 90%.

The rejection percentage of a filtration medium with respect to a particular minor component is generally calculated by dividing the weight percentage of the minor component within the permeate stream by the weight percentage of the minor component within the liquid feed stream, and multiplying by 100%, when the filter is operated at steady state. When determining the rejection percentage of a filtration medium with respect to a minor component, the filtration medium should be arranged as a single spiral wound membrane element that is 8 inches in diameter and 40 inches in length. The filtration medium should contain 30 mil thick feed channel spacers to produce an active membrane area that is 400 square feet. The permeate flow rate should be equal to 10% of the feed flow rate. In addition, the feed stream should include only the minor component whose rejection percentage is being determined and the major component, with the concentration by of the minor component at a level such that the osmotic pressure of the feed stream is 26 bar. In addition, the feed stream should be set at a temperature of 25 degrees Celsius, have a pH of 7, and be fed to the filter at a pressure of 800 psi gauge.

In some cases, the osmotic pressure differential across the filtration medium ($\Delta\Pi$) can vary substantially from the osmotic pressure of the feed, for example, if minor components contained within the feed stream are not well rejected by the filtration medium.

In cases in which the osmotic pressure differential varies from the osmotic pressure of the feed, it may be desirable to achieve a substantially continuous rate of major component transfer across the filtration medium. However, if the hydraulic pressure on the retentate side is not adjusted to account for variations in the osmotic pressure differential, the rate of transfer of the major component across the filtration medium will be variable. Accordingly, in some embodiments, the net driving pressure differential across the filtration medium (e.g., filtration medium 106 of FIG. 1, any of filtration media 206A-206C of FIG. 2, and/or any of filtration media 306A-306I of FIGS. 3-7) is maintained at a substantially constant value as a function of time during operation of the filtration system.

The net driving pressure differential ($\Delta P_{Net}$) corresponds to the difference between the established hydraulic pressure differential across the filtration medium ($\Delta P_E$) and the osmotic pressure differential across the filtration medium ($\Delta\Pi$), and can be calculated as follows:

$$\Delta P_{Net} = \Delta P_E - \Delta\Pi = (P_R - P_P) - (\Pi_R - \Pi_P)$$

In certain cases, the osmotic pressure may not be uniform on the retentate side ($\Pi_R$) or the permeate side ($\Pi_P$) of the filter. Accordingly, for the purposes of calculating the net pressure differential, the osmotic pressure on the retentate side of the filter is calculated as the spatial average osmotic pressure at the surface of the retentate side of the filtration medium, and the osmotic pressure on the permeate side of the filter is determined as the spatial average osmotic pressure at the surface of the permeate side of the filtration medium. Such osmotic pressures can be calculated by positioning component concentration sensors at a statistically representative number of points on the retentate and permeate sides of the filtration medium.

In addition, in some cases, the gauge pressure may not be uniform on the retentate side ($P_R$) or the permeate side ($P_P$) of the filter. Accordingly, for the purposes of calculating the net pressure differential, the gauge pressure on the retentate side of the filter is calculated as the spatial average gauge pressure at the surface of the retentate side of the filtration medium, and the gauge pressure on the permeate side of the filter is determined as the spatial average gauge pressure at the surface of the permeate side of the filtration medium. Such gauge pressures can be calculated by positioning pressure sensors at a statistically representative number of points on the retentate and permeate sides of the filtration medium.

In some embodiments, during a majority of the time over which the filter is operated (e.g., over at least about 50%, at least about 70%, at least about 90%, at least about 95%, at least about 99%, or all of the time over which the filter is operated) the net driving pressure differential is maintained at a substantially constant value (i.e., within about 50%, within about 25%, within about 10%, within about 5%, within about 2%, or within about 1% of a time-averaged value during the period of time over which incoming liquid is filtered by the filter). Maintaining the net driving pressure differential at a substantially constant value may be achieved, for example, by adjusting the hydraulic pressure differential established across the filtration medium, for example, in response to a change in the concentration of one or more minor components in the permeate, in the retentate, or in the feed.

In certain cases in which the average osmotic pressure differential across the filtration medium differs within two or more filters, it may be desirable to achieve a substantially continuous rate of major component transfer across each of the filtration media during that step. However, if the hydraulic pressure on the retentate side of the filter is not adjusted to account for variations in the osmotic pressure differential, the rate of transfer of the major component across the filtration medium will vary from filter to filter. Accordingly, in some embodiments, the average net driving pressure differential across the filtration media of two (or more, or all) filters or the mass flow rate of the permeate from two (or more, or all) filters is maintained at a substantially constant value during a majority of the time over which the hydraulic pressure is applied. For example, in some embodiments, during a majority of the time during which the hydraulic pressure differential is applied across the filters (e.g., over at least about 50%, at least about 70%, at least about 90%, at least about 95%, at least about 99%, or all of the time over which the hydraulic pressure differential is applied across the filters) the average net driving pressure differential within two (or more, or all) of the filters are maintained at substantially similar values (i.e., within 50%, within 25%, or within 5% of the higher of the two average net driving pressures during the period over which the hydraulic pressure differential is applied). In some embodiments, during a majority of the time during which the hydraulic pressure differential is applied across the filters (e.g., over at least about 50%, at least about 70%, at least about 90%, at least about 95%, at least about 99%, or all of the time over which the hydraulic pressure differential is applied across the filters) the permeate flow rates from two (or more, or all) of the filters are maintained at substantially similar values (i.e., within 50%, within 25%, or within 5% of the higher of the two average permeate flow rates during that period of operation). Maintaining the permeate volumetric flow rate or the average net driving pressure differential at substantially similar values in time may be achieved, for example, by adjusting the hydraulic pressure of the stream entering the retentate side of the filter in response to the measured permeate volumetric flow rate, since permeate volumetric flow rate ($\dot{V}_p$) and average net driving pressure differential are linked by the surface area of the filtration medium (A) and its permeability ($A_m$) as follows:

$$\dot{V}_p = A A_m \Delta P_{Net}.$$

The permeability $A_m$ can be approximated, at a given level of hydraulic pressure difference ($\Delta P_E$), by measuring the flow rate of the major component through the filtration medium, per unit area of the filtration medium and per unit of applied hydraulic pressure difference, when a solution consisting solely of the major component is present on the retentate and permeate sides of the filtration medium.

The osmotic pressure ($\Pi$) of a particular liquid mixture containing n minor components is generally calculated as:

$$\Pi = \sum_{j=1}^{n} i_j C_j RT$$

wherein $i_j$ is the van't Hoff factor of the $j^{th}$ minor component, $C_j$ is the molar concentration of the $j^{th}$ minor component, R is the ideal gas constant, and T is the absolute temperature of the mixture. For the purposes of determining the osmotic pressure of a liquid stream (e.g., a feed stream, a permeate stream, a retentate stream, etc.) the osmotic pressure is calculated by measuring average concentrations of minor components within the stream, and calculating $\Pi$ using the above equation. For mixtures containing a single minor component, the osmotic pressure ($\Pi$) is calculated as:

$$\Pi = iCRT$$

wherein i is the van't Hoff factor of the minor component, C is the molar concentration of the minor component, R is the ideal gas constant, and T is the absolute temperature of the mixture.

The net driving pressure differential could be controlled using methods that would be apparent to those of ordinary skill in the art, given the insights provided by the instant disclosure. For example, in some embodiments, the net driving pressure differential could be controlled by measuring the permeate flow rate and adjusting the applied hydraulic pressure to keep the permeate flow rate constant in time.

In certain embodiments, the net driving pressure differential could be controlled using an open loop pressure control scheme. For example, if one assumes reasonable rejection of solutes that contribute most to the osmotic pressure of the retentate side solution, the bulk osmotic pressure of the retentate ($\Pi_R$) rises with time (t) as follows:

$$\Pi_R(t = \tau) \approx \frac{\Pi_R(t = 0)}{1 - \frac{\dot{V} \times \tau}{V_0}}$$

where $\dot{V}$ is the volume flow rate of permeate and $V_0$ is the initial volume on the retentate side. The flow of permeate, $\dot{V}$, is given by:

$$\dot{V} \approx A \times A_m \times (\Delta P_E(t) - (\Pi_R(t) \times CPF))$$

where A is the membrane area, $A_m$ is the membrane permeability. $\Delta P_E$ is the established hydraulic pressure difference between the retentate and permeate side, and CPF is the concentration polarization factor. The concentration polarization factor (CPF) can be determined empirically for a system by measuring the flow rate of permeate obtained using a known feed stream composition, a known established hydraulic pressure differential, retentate gauge pressure, and membrane area. The permeate osmotic pressure can be ignored to obtain a first order approximation. Solving the above equation yields an expression for the hydraulic pressure required as a function of time in terms of known quantities:

$$\Delta P_E(t) \approx \frac{\dot{V}}{A \times A_m} + \frac{\Pi_R(t) \times CPF}{1 - \frac{\dot{V} \times t}{V_0}}$$

A variety of filters can be used in association with the embodiments described herein. In certain embodiments, the filter comprises a filtration medium. The filtration medium comprises, according to certain embodiments, any medium, material, or object having sufficient hydraulic permeability to allow at least a portion of the major component of the liquid fed to the filter to pass through the medium, while, at the same time, retaining and/or preventing passage of at least a portion of the minor component(s) of the liquid fed to the filter.

Exemplary filters that may be utilized in various of the embodiments described herein include, but are not limited to, gel permeation filters and membrane-based filters. For example, the filter can be a spiral filter, a flat sheet filter, a hollow fiber filter, a tube membrane filter, or any other type of filter.

The filters described herein can comprise any suitable filtration medium. In some embodiments, the filtration medium comprises a filtration membrane (e.g., a semipermeable membrane). The filtration medium can be fabricated from a variety of materials. For example, the filtration medium can be fabricated from inorganic materials (e.g., ceramics), organic materials (e.g., polymers), and/or composites of inorganic and organic materials (e.g., ceramic and organic polymer composites). Suitable polymeric materials from which the filtration medium may be fabricated include, but are not limited to, poly(tetrafluoroethylene), polysulfones, polyamides, polycarbonates, polyesters, polyethylene oxides, polypropylene oxides, polyvinylidene fluorides, poly(acrylates), and co-polymers and/or combinations of these. In certain embodiments, the filtration medium comprises a polyamide-based salt rejecting layer. Filtration media typically used to make seawater reverse osmosis membranes, brackish water reverse osmosis membrane, and/or or a sanitary reverse osmosis membranes can be used in certain of the embodiments described herein.

In certain embodiments, the filtration medium is in the form of a thin film membrane, for example, having a thickness of less than about 1 millimeter, less than about 500 micrometers, or less than about 250 micrometers. In some embodiments, the filtration medium is a thin-film composite membrane.

According to certain embodiments, the filtration medium can be selected to have a porosity and molecular weight cutoff that allows passage of the major component of the liquid feed through the filtration medium while retaining a sufficiently large portion of the minor component(s) that the minor component(s) (e.g., the target minor component) is concentrated on the retentate side of the filtration medium.

In embodiments where the filtration medium is used to de-water a liquid feed, the filtration membrane can be selected so that it is able to freely pass water, while, at the same time, retaining, on the retentate side, a sufficient amount of the minor component(s) (e.g., the target minor component) to result in concentration of the minor component on the retentate side of the filtration medium.

According to certain embodiments, the filtration medium is a reverse osmosis membrane. The reverse osmosis membrane can have an average pore size of less than about 0.001 micrometers, in some embodiments. In certain embodiments, the reverse osmosis membrane can have a molecular weight cutoff of less than about 200 g/mol. In some embodiments, the filtration medium is a nanofiltration membrane. The nanofiltration membrane can have an average pore size of between about 0.001 micrometers and about 0.01 micrometers, in some embodiments. In certain embodiments, the nanofiltration membrane can have a molecular weight cutoff of between about 200 g/mol and about 20,000 g/mol. In certain embodiments, the filtration medium is an ultrafiltration membrane. The ultrafiltration membrane can have, according to certain embodiments, an average pore size of between about 0.01 micrometers and about 0.1 micrometers. In some embodiments, the ultrafiltration membrane has a molecular weight cutoff of between about 20,000 g/mol and about 100,000 g/mol. In some embodiments, the filtration medium is a microfiltration membrane. The microfiltration membrane can have an average pore size of between about 0.1 micrometers and about 10 micrometers, according to certain embodiments. In some embodiments, the microfiltration membrane has a molecular weight cutoff of between about 100,000 g/mol and about 5,000,000 g/mol.

According to certain embodiments, at least one (or all) of the filtration media used in the filtration system has a relatively high standard salt rejection. The standard salt rejection is a term generally known to those of ordinary skill in the art, is generally measured as a percentage, and can be determined using the following test. A 400 square foot sample of the filtration medium is assembled into a spiral wound element of 40 inches in length and 8 inches in diameter, having a retentate spacer thickness (i.e., the distance from the retentate wall to the filtration medium) of 30 mil and a permeate spacer thickness (i.e., the distance from the permeate wall to the filtration medium) of 30 mil. A feed stream containing water and dissolved NaCl at a concentration of 32,000 mg/L and a pH of 7 is fed to the retentate side of the filter. The feed is pressurized to 800 psi gauge, with the permeate side of the filter maintained at atmospheric pressure. The filter is operated at a recovery ratio (i.e., the permeate flow rate divided by the feed flow rate, multiplied by 100%) of 10% and a temperature of 25° C. The standard salt rejection is determined, after 30 minutes of operation and at steady state, using the following formula:

$$R_S = \frac{w_{NaCl,permeate}}{w_{NaCl,feed}} \times 100\%$$

wherein $w_{NaCl,permeate}$ is the weight percentage of NaCl in the permeate and $w_{NaCl,feed}$ is the weight percentage of NaCl in the feed. According to certain embodiments, at least one (or all) of the filtration media used in the filtration system has a standard salt rejection of at least about 99%, at least about 99.5% or at least about 99.8%.

According to certain embodiments, the filter comprises a vessel within which the filtration medium is housed. In some embodiments, the vessel is configured to withstand a relatively high internal hydraulic pressure without rupturing. The ability of the filter vessel to withstand high hydraulic pressures can be advantageous in certain cases in which high hydraulic pressures are employed to achieve a desired degree of separation between the major component and the minor component(s) of the liquid fed to the filter. In some embodiments, the vessel of the filter is configured to withstand an internal hydraulic pressure of at least about 3900 psi gauge without rupturing.

According to certain embodiments, the filtration systems described herein can be configured to operate at relatively high hydraulic pressures. In some embodiments, the pumps, conduits, and/or any other system components can be operated at a hydraulic pressure of at least about 400 psi without failing.

Examples of suitable filters that could be used in association with certain of the embodiments described herein include, but are not limited to, those available from Hydranautics (Oceanside, Calif.) (e.g., under part numbers ESPA2-4040, ESPA2-LD-4040, ESPA2-LD, ESPA2MAX, ESPA4MAX, ESPA3, ESPA4-LD, SanRO HS-4, SanRO HS2-8, ESNA1-LF2-LD, ESNA1-LF2-LD-4040, ESNA1-LF-LD, SWC4BMAX, SWC5-LD-4040, SWC5-LD, SWC5MAX, SWC6-4040, SWC6, SWC6MAX, ESNA1-LF2-LD, ESNA1-LF-LD, ESNA1-LF2-LD-4040, ESNA1-LF-LD-4040, HYDRAcap60-LD, and HYDRAcap60); Dow Filmtec via Dow Chemical Company (Midland, Mich.) (e.g., under part numbers HSRO-390-FF, LC HR-4040, LC LE-4040, SW30HRLE-4040, SW30HRLE-440i, SW30HRLE-400i, SW30HRLE-370/341, SW30XHR-400i, SW30HRLE-400, SW30HR-380, NF90-400, NF270-400, NF90-4040); Toray Industries, Inc. (e.g., under part numbers TM720-440, TM720C-440, TM720L-440); Koch Membrane Systems, Inc. (Wilmington, Mass.) (e.g., under part numbers 8040-HR-400-34, 8040-HR-400-28); and LG NanoH$_2$O (El Segundo, Calif.) (e.g., under part numbers Qfx SW 400 ES, Qfx SW 400 SR, Qfx SW 400 R). In some embodiments, the filter comprises a thin film composite membrane. For example, the thin film composite membrane can comprise a non-woven fabric with a thickness of about 150 micrometers used as a mechanical support. A porous polysulfone layer (e.g., roughly 60 micrometers in thickness) can be placed upon the support layer by a phase inversion method. A polyamide layer (e.g., of roughly 200 nm) can be cast upon the polysulfone layer using interfacial polymerization.

Certain of the embodiments described herein involve controlling the concentration(s) of minor component(s) within various portions of the filtration system. Those of ordinary skill in the art, with the insight provided by the instant disclosure, would be capable of selecting suitable operating parameters and/or system components to achieve desired concentration levels using no more than routine experimentation. For example, the surface area of the filtration medium, filtration medium properties, the applied differential hydraulic pressures, flow rates, and other operating parameters can be selected according to the needs of the particular application. As one particular example, the selection of suitable operating parameters and/or equipment characteristics can be based upon the total volume of concentrate to be produced over a given period of time, the amount of incoming liquid feed that is to be concentrated over a given period of time, or other factors as apparent to those of ordinary skill in the filtration arts. In some cases, screening tests may be performed for selecting appropriate types of filter vessels and/or filtration media by performing a trial filtration of a dilute liquid feed with a particular filter until a desired degree of concentration is obtained, followed by collecting the concentrate from the retentate side of the filter, reconstituting the liquid feed with a volume of fresh major component (equal to the volume of major component removed during filtration), and comparing the taste and/or flavor characteristics of the reconstituted liquid feed to that of the initial liquid feed. Operating pressures, filter properties, flow rates, and other operating parameters may be selected on the basis of well-known principles filtration and/or separations, described in many well-known and readily available texts describing filtration/reverse osmosis, combined with routine experimentation and optimization. Appropriate hydraulic pressures and/or flow rates could be established using feedback control mechanisms (e.g., open or closed loop feedback control mechanisms) known to those of ordinary skill in the art.

In certain embodiments, liquid(s) within filter(s) can be kept at relatively cold temperatures. For example, in some embodiments, the liquid(s) within at least one filter of the filtration systems described herein can be maintained at a temperature of about 8° C. or less (e.g., between about 0° C. and about 8° C.). In some embodiments, the liquids within all filters of the filtration system are maintained at a temperature of about 8° C. or less (e.g., between about 0° C. and about 8° C.).

In certain embodiments, one or more filters may include a gaseous headspace, for example, above a liquid contained within the filter. In some such embodiments, the gaseous headspace may be filled with a gas that does not substantially react with any components of the liquid within the filter. In some such embodiments, the gaseous headspace may be filled with a gas that does not substantially react with any minor components of the liquid within the filter. In some such embodiments, the gaseous headspace may be filled with a gas that does not substantially react with the target minor component of the liquid within the filter. All or a portion of the gaseous headspace may be made up of, for example, carbon dioxide, nitrogen, and/or a noble gas. In some embodiments, all or a portion (e.g., at least about 5 wt %, at least about 25 wt %, or at least about 50 wt %) of the gaseous headspace within at least one filter (or all filters) of the filtration system is made of up carbon dioxide. In some embodiments, the gaseous headspace contains oxygen in an amount of less than about 1 part per billion.

In certain embodiments, any of the filtration systems and/or processes described herein can be operated continuously. For example, certain methods may involve the continuous flow of a liquid feed and the continuous production of one or more retentate streams (e.g., enriched in the target minor component relative to the liquid feed) and/or one or more permeate streams (e.g., enriched in the major component relative to the liquid feed). In some cases, the method may involve conducting one or more steps of the filtration process simultaneously. For example, in some embodiments, hydraulic pressure differentials may be applied across at least two (or all) of the first filter, the second filter, and/or the third filter simultaneously. In some such embodiments, a first permeate, a first retentate, a second permeate, a second retentate, a third permeate, and/or a third retentate may be produced simultaneously. In some continuous embodiments, the method may be performed at steady state.

Unless indicated to the contrary, all concentrations and relative abundances of the components described herein are determined using weight percentages.

In various embodiments herein, "at least a portion" of a stream is transported to a location (e.g., a filter, another stream, or a mixing point), recycled, and/or mixed with another stream (or at least a portion of another stream). In certain embodiments in which "at least a portion" of a stream is transported to a location, recycled, and/or mixed with another stream, at least about 10 wt %, at least about 25 wt %, at least about 50 wt %, at least about 75 wt %, at least about 90 wt %, at least about 95 wt %, at least about 99 wt %, or all of the original stream may be transported to the location, recycled, and/or mixed with the other stream (or portion of the other stream).

Various of the filters, filter portions, and/or streams are described herein and/or illustrated in the figures as being optionally "directly fluidically connected" to other portions of a system (e.g., another filter or filter portion and/or another stream). According to certain embodiments, a first location (e.g., stream or component) and a second location (e.g., stream or component) that are described or illustrated as being directly fluidically connected may be fluidically connected such that the composition of the fluid does not substantially change (i.e., no fluid component changes in relative abundance by more than 1%) as it is transported from the first object to the second object.

U.S. Provisional Patent Application Ser. No. 62/080,675, filed Nov. 17, 2014 and entitled "Concentration Control in Filtration Systems, and Associated Methods," is incorporated herein by reference in its entirety for all purposes.

The following examples are intended to illustrate certain embodiments of the present invention, but do not exemplify the full scope of the invention.

Example 1

This example describes the use of a filtration medium to separate ethanol from water.

A sample of a thin film composite reverse osmosis membrane measuring 4.9 cm in diameter was installed within a dead-end, stirred cell (HP4750; Sterlitech). The cell was filled with 300 mL of a 3.9+/−0.05% ABV (alcohol by volume) ethanol-in-water solution at 21 degrees Celsius. A magnetic stirrer was turned on and a pressure of 1000 psi was applied using a nitrogen cylinder connected to the cell. Permeate was collected over a period of 30 minutes. This permeate was discarded and additional permeate was collected for another 20 minutes. After this 20 minute period, a 1 mL sample was taken from the permeate that had been collected. The ethanol content of the permeate samples was determined using gas chromatography in conjunction with a mass spectrometer. Ion chromatogram results, benchmarked against a standard curve for ethanol concentration, indicated a permeate ethanol concentration of 1.76+/−0.003%, corresponding to an ethanol rejection of 55%+/−1%.

In a separate test using the same setup as described above, an aqueous feed solution containing 32,000+/−600 mg/L of NaCl as the sole solute was introduced into the cell. The conductivity of the solution was determined, at 25° C., to be 48.5+/−0.5 mS/cm. The magnetic stirrer was turned on and a pressure of 1000 psi was applied using a nitrogen cylinder connected to the cell. Permeate was collected over a period of 30 minutes. This permeate was discarded and additional permeate was collected for another 15 minutes. After this 15 minute period, the permeate conductivity was determined, at 25° C., to be 1.28+/−0.01 mS/cm. This corresponded to a salt rejection of roughly 97.5+/−1% (which may be lower than the membrane's true value due to leakage of the feed stream around the membrane into the permeate).

Example 2

This example describes the use of a filtration medium to concentrate beer.

Using the same setup as described in Example 1, a 290+/−10 mL sample of a 4.8% ABV Hefeweizen beer was introduced into the stirred cell. Prior to introducing the beer into the cell, the cell was first purged with carbon dioxide. A cooling jacket was applied around the stirred cell to maintain the fluid at 2+/−5° C. The stirrer was turned on and a pressure of 1000 psi was applied. The test was allowed to run until a mass of permeate roughly equaling half of the initial mass of the feed liquid was produced. The first concentrate was then set aside and stored at 5° C. in a container that had been pre-purged with $CO_2$.

The cell was rinsed with distilled water and the first permeate was introduced into the cell. Prior to introducing the first permeate into the cell, the cell was purged with carbon dioxide. A cooling jacket was applied around the stirred cell to maintain the fluid at 2+/−5° C. Again, the stirrer was turned on and a pressure of 1000 psi was applied. The test was allowed to run until 119.7+/−0.1 g of a second permeate were produced. The fluid within the cell (the second concentrate) was mixed with the first concentrate to produce a final concentrate.

The final concentrate was then mixed with distilled water that had been force carbonated to contain 5 volumes of $CO_2$ at a ratio of 9:11 to produce a reconstituted beer. This level of carbonation of the distilled water was chosen to target roughly 2.5 volumes of $CO_2$ in the reconstituted beer. Distilled water was employed so that the reconstituted beer would best match the original beer in taste. This is important as beer drinkers place great importance on the water source from which the beer was made. By using water that is comprised of more than 99.999999% or more than 99.9999999% $H_2O$ by weight, the reconstituted beer's taste will only be a function of the source water used in the brewing of the original beer and not of the water used to reconstitute the beer. As an alternative to distilled water, deionized water with a conductivity of less than 5 µS/cm or less than 1 µS/cm or less than 0.1 µS/cm could have been employed for reconstitution. As another alternative, well water, surface water or water from a municipal supply could have been employed so long as it had first been filtered by a single pass or two passes of nano-filtration or of reverse osmosis.

The reconstituted beer was submitted to a professional tasting panel, who noted that the aroma profile was substantially maintained though the reproduced beer had suffered from oxidation—likely due to inadvertent contact with air during the process. The effects of oxidation were less prominent, however, than in previous tests where the process temperature was above 2+/−5° C.—likely because of the slower rate of oxidation at lower temperatures.

The ethanol content of samples was determined using gas chromatography in conjunction with a mass spectrometer. Ion chromatogram results, benchmarked against a standard curve for ethanol concentration, indicated that the first concentrate, the second concentrate, the final concentrate and the second permeate contained 10.94+/−0.01, 3.57+/−0.02, 8.51+/−0.04 and 0.21+/−0.002 ABV. This implies that the ethanol passage of the overall process (the ratio of ethanol concentration in the second permeate to that in the initial feed) was 4.5% and the ethanol rejection of the overall process (unity minus the ethanol passage) was 95.5%. The high level of ethanol rejection was likely due to the low temperature at which the process was run, allowing ethanol diffusion through the membrane to be slowed.

Example 3

This example describes a filtration system that could be used to filter ethanol from a liquid mixture containing ethanol and water.

There are two significant challenges in the filtration of ethanol from a mixture of ethanol and water. One challenge is the low rejection of ethanol by polyamide membranes. In many cases, this results in the need for multiple passes of filtration to achieve sufficient ethanol removal rates. Another challenge is posed by the desire to achieve a high concentration of ethanol in the final retentate stream, for example, to reduce transport costs. This results, in many cases, in a requirement for multiple stages of filtration to maximize the removal of water.

One remedy to these issues is to arrange filters in such a manner that streams are mixed and recycled to minimize the number of passes and stages required, but such that filters are arranged in a manner such that, where streams are blended, the osmotic pressure of the streams to be blended is similar. This circumvents the detrimental effects to the system's overall separation of ethanol that would occur if streams of differing ethanol concentrations were blended.

In this example, each filter is assumed to have a recovery ratio of roughly 50% (i.e., concentration factor of roughly 2). It is also assumed that the ethanol passage in each filter is 25%. The exemplary filtration system is a two-pass, two-stage filtration system with permeate recycling, similar to the embodiment illustrated in FIG. 4. In the exemplary mode of operation, feed stream 308 can have a mass flow rate of 3 kg/s and a 4 wt % concentration of ethanol. First retentate stream 312A can have a mass flow rate of 2 kg/s and a 6.5 wt % concentration of ethanol. First permeate stream 314A can have a mass flow rate of 2 lbs/min and a 1.5 wt % concentration of ethanol. Second retentate stream 312B can have a mass flow rate of 1 lbs/min and a 2.5 wt % concentration of ethanol. Second permeate stream 314B can have a mass flow rate of 1 lbs/min and a 0.58 wt % concentration of ethanol. Third retentate stream 312C can have a mass flow rate of 1 lbs/min and a 10.5 wt % concentration of ethanol. Third permeate stream 314C can have a mass flow rate of 1 lbs/min and a 2.5 wt % concentration of ethanol. Fourth retentate stream 312D can have a mass flow rate of 1 lbs/min and a 4 wt % concentration of ethanol. Fourth permeate stream 314D can have a mass flow rate of 1 lbs/min and a 0.95 wt % concentration of ethanol. The configuration in this example achieves an overall concentration factor of about 2.6 (calculated by comparing the concentration of ethanol in stream 312C to the concentration of ethanol in stream 308). This configuration can be especially useful when there is a significant level of ethanol passing into the permeate stream of each filter. If ethanol passage is about 38%, then two filter stages, each concentrating by a factor of 2 will be needed to bring the permeate back to a level where it can be recycled to the feed stream at a matching concentration. If ethanol passage were lower, then it could be desirable to employ recovery ratios above 50% in each of the $2^{nd}$ pass units. This might be done by exceeding the convention of 50% recovery per stage, or perhaps by replacing each unit with two stages operating at 30% recovery each. The converse would be true if ethanol passage were to be higher than 25%.

The recycle stream (e.g., stream 312D in FIG. 4) is helpful as it reduces the total number of reverse osmosis units required to achieve the desired overall concentration factor. An alternative would be to build an additional system to concentrate the retentate from the second stage of the second pass. It is also helpful to concentrate streams up to the level of the initial feed to the system before recycling. This is a superior approach, from the perspective of separation efficiency and energy efficiency, to the recycling of a stream of lower ethanol concentration.

In some cases, it may be desirable to omit the first stage of the second pass and direct the permeate from the first stage of the first pass directly to the final permeate stream. It may also be desirable to employ a split partial second pass (or a partial second pass) on the first stage of the first pass—meaning a portion of the permeate from the first stage of the first pass would bypass the first stage of the second pass. The incremental decrease in final product purity achieved by the entire system, when the first stage of the first pass is partially or wholly eliminated, is small. This is because the solute passage in the first stage of the first pass, or in the first portion of this filtration step, is typically low due to the high flux that prevails because the osmotic pressure of the feed is low. For this reason the benefit of omitting all or part of the first stage of the second pass can be a significant reduction in capital cost and operation cost while only slightly compromising the overall solute rejection of the system.

In some cases, it may be desirable to operate with multiple filters in place of any of the single filters (e.g., any of the single filters illustrated in the first pass). By operating in this fashion, the recovery ratio within each unit could be reduced, which could allow for more uniform flux and thus more uniform fouling in each unit.

It may also be desirable to employ higher flux in filter 301B and/or filter 301D than in filter 301A and/or filter 301C, in order to increase the rejection that may be achieved. Since the permeate streams from filters 301B and 301D are not recycled, increases in rejection would not upset the system architecture in its efforts to blend only streams of similar concentration of ethanol.

While the recovery ratio and ethanol passage of each filter have, for the purpose of this example, been fixed—in practice their values in FIG. 4 could be determined and selected in the following manner:

Filters 301A and 301C could be designed for a recovery ratio of 50%, through a selection of filters, applied hydraulic pressures and flow rates that is familiar to those experienced in the art. Through augmentation of commercial filtration system design software, such as Q+, IMS Design or ROSA, with data on the effect of ethanol concentration upon osmotic pressure and data on the diffusion coefficient of ethanol through the filtration medium, the ethanol passage of filter 301A and 301C could be determined. Those skilled in the art could then select the filters, flow rates and level of applied hydraulic pressure for filters 301B and 301D that would allow the ethanol concentration of streams mixing at points 350 and those mixing at 308 to be substantially the same.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A reverse osmosis separation system for enriching a minor component of a liquid feed, the liquid feed having concentrations of a major component and the minor component, the minor component being non-ionic and having a molecular weight less than about 150 g/mole, wherein the concentration of the minor component in the liquid feed is at least about 0.00001% to less than 50% by weight, the system comprising:
   a plurality of passes in a first grouping, including a first pass, wherein (i) each pass has at least one reverse osmosis membrane filtration unit, each membrane filtration unit having at least one membrane that at least partially rejects ethanol, (ii) each pass has a feed stream inlet for a feed stream, a permeate stream outlet for a permeate stream, and a retentate stream outlet for a retentate stream, (iii) the feed stream inlet of each pass, other than the first pass, is coupled to the permeate stream outlet of a preceding pass, and (iv) the retentate stream outlet, of a selected pass, after the first pass, is coupled to the feed stream inlet of the first pass;
   a retentate side of a particular one of the reverse osmosis membrane filtration units of the first grouping coupled to a reverse osmosis membrane filtration unit, distinct from the particular one, such that (a) a first fluid on the retentate side of the particular one is configured to be coupled to the second fluid in the distinct one and (b) the distinct one receives second fluid from the first grouping; and
   a feedback control system comprising one or more pumps and one or more sensors configured to control the concentration of the minor component in the one of the first and second fluids having a lesser concentration thereof to match within 50% the concentration of the minor component of the other of the first and second fluids.

2. A system according to claim 1, further comprising:
   a set of reverse osmosis membrane filtration units in a second grouping to provide second stage filtration, the set having at least one member, wherein each filtration unit in the set has a feed stream inlet coupled to a retentate stream outlet of a selected pass in the first grouping and a permeate stream outlet coupled to a retentate stream outlet of a pass subsequent to the selected pass in the first grouping, and wherein the distinct reverse osmosis membrane filtration unit is in the second grouping,
   the first fluid corresponding to the retentate stream outlet of the pass subsequent to the selected pass in the first grouping, and
   the second fluid corresponding to the permeate stream outlet of the distinct reverse osmosis membrane filtration unit in the second grouping.

3. A system according to claim 2, wherein the system is configured to recycle retentate from the retentate stream outlet, of a selected pass of the second grouping, to the feed stream inlet of a pass of the first grouping.

4. A system according to claim 1, further comprising:
   a set of reverse osmosis membrane filtration units in a second grouping to provide second stage filtration, the set having at least one member, and
   wherein the system is configured to recycle retentate from the retentate stream outlet, of a selected pass of the second grouping, to the feed stream inlet of a pass of the first grouping, wherein the first fluid corresponds to fluid in the feed stream inlet of the pass of the first grouping and the second fluid corresponds to the retentate from the retentate stream outlet of the selected pass of the second grouping.

5. A system according to claim 1, wherein the at least one membrane has a rejection percentage of the minor component between about 10% and about 99%.

6. A system according to claim 1, wherein the at least one membrane has a rejection percentage of the minor component between about 35% and about 90%.

7. A system according to claim 1, wherein the at least one membrane has a rejection percentage of the minor component between about 60% and about 90%.

8. A reverse osmosis separation system for enriching a minor component of a liquid feed, the liquid feed having concentrations of a major component and the minor component, the minor component being non-ionic and having a molecular weight less than about 150 g/mole, wherein the concentration of the minor component in the liquid feed is at least about 0.00001% to less than 50% by weight, the system comprising:
   a first filter comprising a first filtration medium defining a permeate side and a retentate side of the first filter;
   a second filter comprising a second filtration medium defining a permeate side and a retentate side of the second filter;
   a third filter comprising a third filtration medium defining a permeate side and a retentate side of the third filter;
   a fluidic connection between:
      (a) the liquid feed and the retentate side of the first filter;
      (b) the permeate side of the first filter and the retentate side of the second filter;
      (c) the retentate side of the first filter and the retentate side of the third filter; and
      (d) the retentate side of the second filter and the retentate side of the third filter or the retentate side of the second filter and the permeate side of the third filter, wherein each of the fluidic connections is configured to convey a liquid stream; and
   a feedback control system comprising one or more pumps and one or more sensors configured to control:
   a lesser of the concentration of the minor component (1) in the liquid stream within the fluidic connection between the retentate side of the third filter and the retentate side of the first filter and (2) in the liquid feed to match within 50% a greater of the concentration of the minor component (1) in the liquid stream within the fluidic connection between the retentate side of the third filter and the retentate side of the first filter and (2) in the liquid feed; and/or
   the concentration of the minor component in the liquid stream within the fluidic connection between the retentate side of the second filter and the permeate side of the third filter, such that a lesser of the concentration of the minor component (1) in the liquid stream leaving the permeate side of the third filter and (2) in the liquid stream leaving the retentate side of the second filter matches within 50% a greater of the concentration of the minor component (1) in the liquid stream leaving the permeate side of the third filter and (2) in the liquid stream leaving the retentate side of the second filter.

9. The system of claim 8, further comprising:
a fourth filter comprising a fourth filtration medium defining a permeate side and a retentate side of the fourth filter; and
a fluidic connection between the retentate side of the fourth filter, the retentate side of the second filter and the permeate side of the third filter.

10. The system of claim 9, further comprising a fluidic connection between the retentate side of the fourth filter and the retentate side of the first filter.

11. The system of claim 9, wherein the fourth filtration medium comprises a filtration membrane.

12. The system of claim 8, wherein the first filter, the second filter, and/or the third filter includes a vessel within which the corresponding filtration medium is housed, and the vessel is configured to withstand an internal hydraulic pressure of at least about 3900 psi gauge without rupturing.

13. The system of claim 8, further comprising a pump connected to the second filter and configured to transport liquid from the second filter to the third filter.

14. The system of claim 8, wherein the first filter and the second filter are directly fluidically connected.

15. The system of claim 8, wherein the second filter and the third filter are directly fluidically connected.

16. The system of claim 8, wherein the first filtration medium, the second filtration medium, and/or the third filtration medium comprises a filtration membrane.

17. The system of claim 16, wherein the filtration membrane comprises a reverse osmosis membrane.

18. The system of claim 8, wherein one or more of the first filtration medium, the second filtration medium, or the third filtration medium has a rejection percentage of the minor component between about 10% and about 99%.

19. The system of claim 8, wherein one or more of the first filtration medium, the second filtration medium, or the third filtration medium has a rejection percentage of the minor component between about 35% and about 90%.

20. The system of claim 8, wherein one or more of the first filtration medium, the second filtration medium, or the third filtration medium has a rejection percentage of the minor component between about 60% and about 90%.

21. A system according to claim 1, wherein the concentration of the minor component in the liquid feed is at least about 0.001% to less than 50% by weight.

22. The system of claim 8, wherein the concentration of the minor component in the liquid feed is at least about 0.001% to less than 50% by weight.

* * * * *